United States Patent
Damnjanovic et al.

(10) Patent No.: US 9,949,315 B2
(45) Date of Patent: *Apr. 17, 2018

(54) TECHNIQUES FOR ENABLING ASYNCHRONOUS TRANSMISSIONS IN AN UNLICENSED RADIO FREQUENCY SPECTRUM BAND

(71) Applicant: QUALCOMM Incorporated, San Diego, CA (US)

(72) Inventors: Aleksandar Damnjanovic, Del Mar, CA (US); Wanshi Chen, San Diego, CA (US); Naga Bhushan, San Diego, CA (US); Peter Gaal, San Diego, CA (US); Kiran Kumar Somasundaram, San Diego, CA (US); Tao Luo, San Diego, CA (US); Yongbin Wei, San Diego, CA (US); Durga Prasad Malladi, San Diego, CA (US); Hao Xu, San Diego, CA (US); Tingfang Ji, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 308 days.

This patent is subject to a terminal disclaimer.

(21) Appl. No.: 14/553,789

(22) Filed: Nov. 25, 2014

(65) Prior Publication Data
US 2015/0245411 A1    Aug. 27, 2015

Related U.S. Application Data

(60) Provisional application No. 61/943,755, filed on Feb. 24, 2014.

(51) Int. Cl.
*H04W 4/00* (2018.01)
*H04W 76/04* (2009.01)
(Continued)

(52) U.S. Cl.
CPC ......... *H04W 76/048* (2013.01); *H04W 16/14* (2013.01); *H04W 72/0426* (2013.01); *H04W 74/08* (2013.01); *H04W 36/22* (2013.01)

(58) Field of Classification Search
CPC ...................................................... H04W 80/04
(Continued)

(56) References Cited

U.S. PATENT DOCUMENTS 8,099,094 B2 * 1/2012 Marinier ............... H04W 8/005
                                                                      370/294
9,491,752 B2 * 11/2016 Damnjanovic ....... H04W 16/14
(Continued)

FOREIGN PATENT DOCUMENTS

| WO | WO-2012101481 A1 | 8/2012 |
| WO | WO-2012106843 A1 | 8/2012 |
| WO | WO-2013054417 A1 | 4/2013 |

OTHER PUBLICATIONS

ISA/EPO, International Search Report and Written Opinion of the International Searching Authority, Int'l App. No. PCT/US2015/016029, May 27, 2015, European Patent Office, Rijswijk, NL, 11 pgs.

*Primary Examiner* — Christopher R Crompton
(74) *Attorney, Agent, or Firm* — Dalei Dong; Holland & Hart LLP

(57) ABSTRACT

Techniques are described for wireless communication. One method includes monitoring, by a first base station of a first operator, for clear channel assessment (CCA) exempt transmission (CET) timing information of a second base station of a second operator; identifying transmission timings of CETs of the second base station of the second operator based at least in part on the monitoring; and discontinuing transmissions of the first base station of the first operator during the transmission timings of the CETs of the second base station of the second operator. Transmissions of the second
(Continued)

base station of the second operator may be asynchronous to transmissions of the first base station of the first operator.

30 Claims, 13 Drawing Sheets

(51) Int. Cl.
*H04W 16/14* (2009.01)
*H04W 74/08* (2009.01)
*H04W 72/04* (2009.01)
*H04W 36/22* (2009.01)

(58) Field of Classification Search
USPC .......................................................... 370/328
See application file for complete search history.

(56) References Cited

U.S. PATENT DOCUMENTS

| | | | |
|---|---|---|---|
| 2003/0190919 A1* | 10/2003 | Niemenmaa | G01S 5/0273 455/456.1 |
| 2008/0031221 A1* | 2/2008 | Nanda | H04J 3/14 370/350 |
| 2009/0040974 A1* | 2/2009 | Goldhamer | H04W 74/02 370/329 |
| 2009/0286552 A1* | 11/2009 | Wu | G01S 5/021 455/456.2 |
| 2009/0290557 A1* | 11/2009 | Muller | H04B 7/2678 370/331 |
| 2011/0039574 A1* | 2/2011 | Charbit | G01S 5/0215 455/456.1 |
| 2011/0128895 A1* | 6/2011 | Sadek | H04W 16/14 370/280 |
| 2012/0027110 A1* | 2/2012 | Han | H04J 11/0079 375/260 |
| 2013/0143589 A1* | 6/2013 | Huang | H04W 52/0254 455/456.1 |
| 2014/0362720 A1* | 12/2014 | Kim | H04B 7/024 370/252 |
| 2015/0131607 A1* | 5/2015 | Koorapaty | H04L 5/0007 370/330 |
| 2015/0156708 A1* | 6/2015 | Tietz | H04W 4/02 455/434 |

\* cited by examiner

TECHNIQUES FOR ENABLING ASYNCHRONOUS TRANSMISSIONS IN AN UNLICENSED RADIO FREQUENCY SPECTRUM BAND

CROSS REFERENCES

The present Application for Patent claims priority to U.S. Provisional Patent Application No. 61/943,755 by Damnjanovic et al., entitled "Techniques for Enabling Asynchronous Transmissions in an Unlicensed Radio Frequency Spectrum Band," filed Feb. 24, 2014, assigned to the assignee hereof, which is hereby incorporated by reference in its entirety.

FIELD OF THE DISCLOSURE

The present disclosure, for example, relates to wireless communication systems, and more particularly to techniques for enabling asynchronous transmissions (e.g., asynchronous clear channel assessment (CCA) exempt transmissions (CETs)) in an unlicensed radio frequency spectrum band.

BACKGROUND

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple mobile devices. A base station may communicate with mobile devices on downlink channels (e.g., for transmissions from a base station to a mobile device) and uplink channels (e.g., for transmissions from a mobile device to a base station).

Some modes of communication may enable communications with a mobile device over different radio frequency spectrum bands (e.g., a licensed radio frequency spectrum band or an unlicensed radio frequency spectrum band) of a cellular network. With increasing data traffic in cellular networks, the offloading of at least some data traffic to an unlicensed radio frequency spectrum band may provide a cellular operator with opportunities for enhanced data transmission capacity. Prior to gaining access to and transmitting data over the unlicensed radio frequency spectrum band, a transmitting apparatus may, in some examples, perform a listen before talk (LBT) procedure to gain access to the unlicensed radio frequency spectrum band. An LBT procedure may include performing a clear channel assessment (CCA) to determine whether a particular channel of the unlicensed radio frequency spectrum band is available. When it is determined that a channel is not available, a CCA may be performed for the channel again at a later time.

Some transmissions of a transmitting apparatus (e.g., a base station or mobile device) may be made without performing a CCA. These CCA exempt transmissions (CETs) may include discovery signals (e.g., synchronization signals or reference signals), system information, or configuration information. If a mobile device fails to receive, from a base station, the CETs associated with a channel of an unlicensed radio frequency spectrum band, the mobile device may be unable to receive or transmit data over the channel of the unlicensed radio frequency spectrum band.

SUMMARY

The present disclosure, for example, relates to one or more techniques for enabling asynchronous transmissions (e.g., asynchronous CETs) in an unlicensed radio frequency spectrum band. In some wireless communication systems, the asynchronous transmissions of a first base station of a first operator and a second base station of at least one second operator may interfere with one another. In the case of some transmissions, such as CETs containing discovery signals, system information, or configuration information, a mobile device's failure to receive the transmissions may prevent the mobile device from receiving or transmitting data over an associated channel of the unlicensed radio frequency spectrum band. To increase the likelihood that mobile devices receive the CETs transmitted by their serving base station, the first base station of the first operator may discontinue transmissions during transmission timings of some transmissions (e.g., CETs) of the second base station of the at least one second operator (the second base station of the at least one second operator being the serving base station in this example). Similarly, the second base station of the at least one second operator may discontinue transmissions during transmission timings of some transmissions (e.g., CETs) of the first base station of the first operator (the first base station of the first operator being the serving base station in this example).

In a first set of illustrative examples, a method for wireless communication is described. In one example, the method may include monitoring, by a first base station of a first operator, for CET timing information of a second base station of at least one second operator; identifying transmission timings of CETs of the second base station of the at least one second operator based at least in part on the monitoring; and discontinuing transmissions of the first base station of the first operator during the transmission timings of the CETs of the second base station of the at least one second operator. Transmissions of the second base station of the at least one second operator may be asynchronous to transmissions of the first base station of the first operator.

In some examples, the method may include detecting the CET timing information for the second base station of the at least one second operator directly from the second base station of the at least one second operator. In these examples, the monitoring may include ceasing data transmissions of the first base station of the first operator during at least one time sub-interval of each of a plurality of time intervals to detect a transmission of a CET of the second base station of the at least one second operator. In some examples, the at least one time sub-interval may change from a first of the plurality of time intervals to a second of the plurality of time intervals.

In some examples of the method, the monitoring may include receiving a report from a mobile device located in a first cell of the first base station of the first operator, and the identifying may include identifying the transmission timings of the CETs of the second base station of the at least one second operator based at least in part on the report from the mobile device. In these examples, the report from the mobile device may include a timing difference between the first base station of the first operator and the second base station of the at least one second operator; a timing difference between a reference CET timing and the transmission timings of the CETs of the second base station of the at least one second operator; or a public land mobile network (PLMN) identifier of the at least one second operator. In some examples, the mobile device may be served by the first base station of the first operator, or the mobile device may be a member of a PLMN of the first operator.

In some examples, the method may include transmitting, by the first base station of the first operator, CETs of the first base station. The CETs of the first base station of the first operator may include system configuration information for the first base station of the first operator. In these examples, the system configuration information for the first base station of the first operator may include information regarding a configuration of a listen before talk (LBT) frame. In some examples, the information regarding the configuration of the LBT frame may indicate a duration of the LBT frame as two milliseconds or five milliseconds.

In some examples, the method may include performing a downlink CCA during a number of orthogonal frequency division multiplexed (OFDM) symbols of a listen before talk (LBT) frame. The number of OFDM symbols may occur at a beginning of a first subframe of the LBT frame.

In some examples of the method, the discontinuing of the transmissions of the first base station of the first operator may include discontinuing transmissions of a cell using an unlicensed radio frequency spectrum band that supports a supplemental downlink (SDL) mode of operation.

In a second set of illustrative examples, an apparatus for wireless communication is described. In one example, the apparatus may include means for monitoring, by a first base station of a first operator, for CET timing information of a second base station of at least one second operator; means for identifying transmission timings of CETs of the second base station of the at least one second operator based at least in part on the monitoring; and means for discontinuing transmissions of the first base station of the first operator during the transmission timings of the CETs of the second base station of the at least one second operator. Transmissions of the second base station of the at least one second operator may be asynchronous to transmissions of the first base station of the first operator. In some examples, the apparatus may further include means for implementing one or more aspects of the method for wireless communication described above with respect to the first set of illustrative examples.

In a third set of illustrative examples, another apparatus for wireless communication is described. In one example, the apparatus may include a processor, memory in electronic communication with the processor, and instructions stored in the memory. The instructions may be executable by the processor to monitor, by a first base station of a first operator, for CET timing information of a second base station of at least one second operator; to identify transmission timings of CETs of the second base station of the at least one second operator based at least in part on the monitoring; and to discontinue transmissions of the first base station of the first operator during the transmission timings of the CETs of the second base station of the at least one second operator. Transmissions of the second base station of the at least one second operator may be asynchronous to transmissions of the first base station of the first operator. In some examples, the instructions may also be executable by the processor to implement one or more aspects of the method for wireless communication described above with respect to the first set of illustrative examples.

In a fourth set of illustrative examples, a non-transitory computer-readable medium storing computer-executable code for wireless communications is described. In one example, the code may be executable by at least one processor to monitor, by a first base station of a first operator, for CET timing information of a second base station of at least one second operator; to identify transmission timings of CETs of the second base station of the at least one second operator based at least in part on the monitoring; and to discontinue transmissions of the first base station of the first operator during the transmission timings of the CETs of the second base station of the at least one second operator. Transmissions of the second base station of the at least one second operator may be asynchronous to transmissions of the first base station of the first operator. In some examples, the instructions may also be executable by the processor to implement one or more aspects of the method for wireless communication described above with respect to the first set of illustrative examples.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
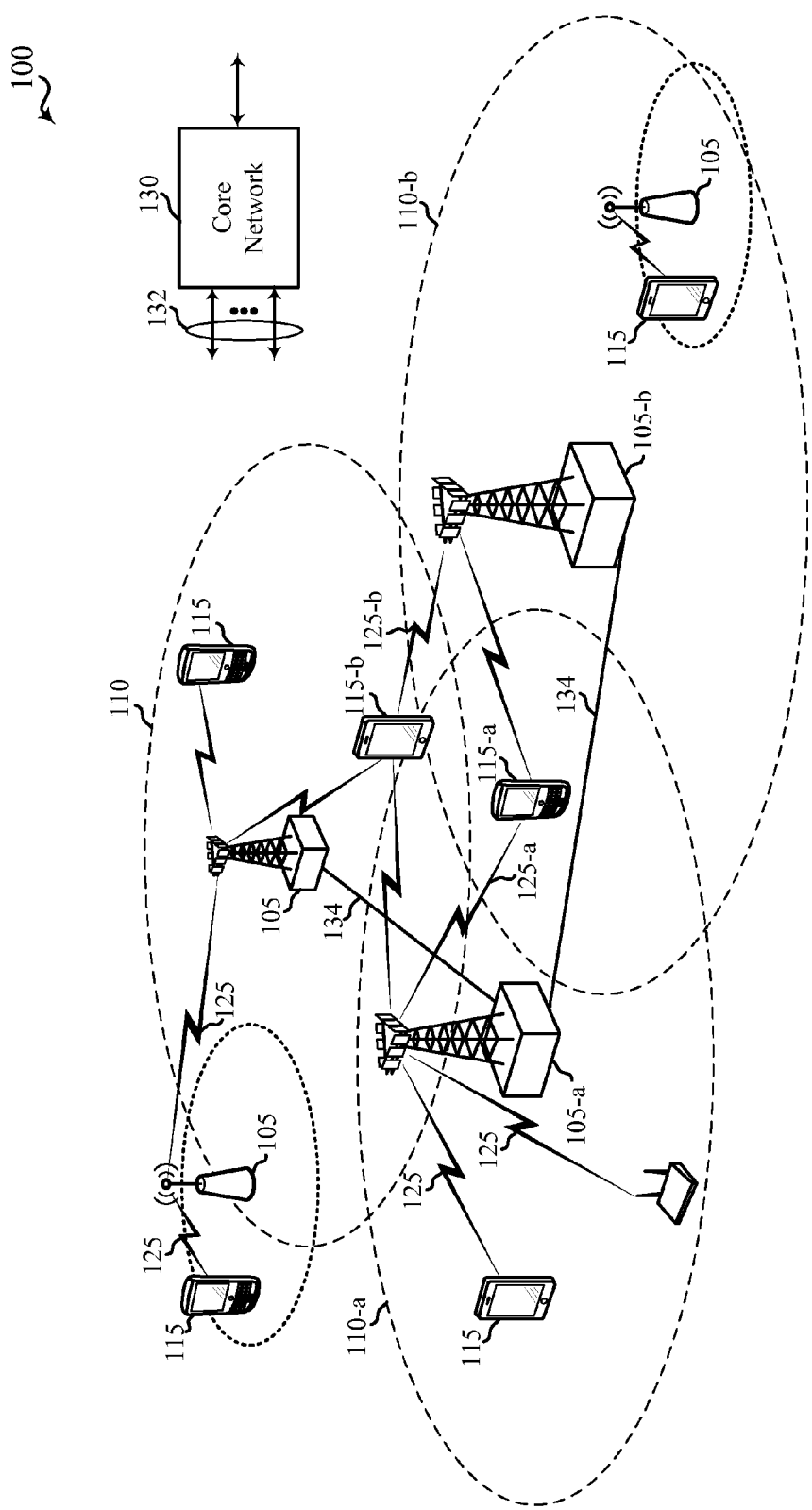
FIG. 1 shows a block diagram of a wireless communication system, in accordance with various aspects of the present disclosure.

Techniques are described in which an unlicensed radio frequency spectrum band (e.g., a radio frequency spectrum band such as a Wi-Fi radio frequency spectrum band, for which apparatuses contend for access because the radio frequency spectrum band is available for unlicensed use) may be used for cellular communications (e.g., Long Term Evolution (LTE) communications or LTE-Advanced (LTE-A) communications).

With increasing data traffic in cellular networks, the offloading of at least some data traffic to an unlicensed radio frequency spectrum band may provide a cellular operator (e.g., an operator of a public land mobile network (PLMN) or a coordinated set of base stations defining a cellular network, such as an LTE/LTE-A network) with opportunities for enhanced data transmission capacity. Prior to gaining access to, and transmitting data over, the unlicensed radio frequency spectrum band, a transmitting apparatus may, in some examples, perform an LBT procedure to gain access to the unlicensed radio frequency spectrum band. Such an LBT procedure may include performing a CCA to determine whether a particular channel of the unlicensed radio frequency spectrum band is available. When it is determined that a channel is not available, a CCA may be performed for the channel again at a later time. Furthermore, use of the unlicensed radio frequency spectrum band may need to be coordinated to ensure that base stations of the same or different operators, using the same or different techniques for accessing the unlicensed radio frequency spectrum band, may share the unlicensed radio frequency spectrum band in a fair manner.

In some cases, fair access to an unlicensed radio frequency spectrum band may be facilitated by the coordination of CCAs performed by different apparatuses or nodes of different operators that want to access the unlicensed radio frequency spectrum band. In some of the CCA coordination methods, CCAs may be coordinated to occur in predetermined time periods amongst multiple apparatuses or nodes that may desire to access the unlicensed radio frequency spectrum band. For example, a time period may be identified during which multiple coordinated nodes may perform CCA for downlink channel access in an unlicensed radio frequency spectrum band. Such coordination results in a synchronous system in which apparatuses or nodes seek access, and transmit radio frequency signals, in a synchronized manner.

While such time-synchronization may be ensured within a single operator deployment, it may or may not be ensured between different operators deploying service on the same channel of an unlicensed radio frequency spectrum band. For example, the base stations of different operators may operate asynchronously. More specifically, if a first set of coordinated base stations (e.g., a set of base stations deployed by a first operator) performs a CCA earlier in an LBT frame than other sets of coordinated base stations (e.g., other sets of base stations deployed by other operators), this first set of coordinated base stations may win contention to access an unlicensed radio frequency spectrum band for a relatively large number of consecutive LBT frames, resulting in multiple consecutive unsuccessful contentions for access to the unlicensed radio frequency spectrum band by the other sets of coordinated base stations. Accordingly, a base station of an operator seeking to access the unlicensed radio frequency spectrum band may perform one or more CCAs to contend for access to one or more LBT frames in which the base station may use the unlicensed radio frequency spectrum band.

When access to the unlicensed radio frequency spectrum is won for one or more LBT frames, a determination may be made as to whether the number of LBT frames for which access to the unlicensed radio frequency spectrum band has been won is equal to or greater than a threshold number of consecutive LBT frames (e.g., N consecutive LBT frames). If the number of LBT frames for which access to the unlicensed radio frequency spectrum band has been won is equal to or greater than the threshold number of consecutive LBT frames, use of the unlicensed radio frequency spectrum band may be relinquished for a period of time (e.g., K LBT frames), in order to allow other operators to access the unlicensed radio frequency spectrum band. The protocol by which a base station may access a channel of the unlicensed radio frequency spectrum band for N LBT frames, but is then required to relinquish access to the channel of the unlicensed radio frequency spectrum band for K LBT frames may be referred to as an N/K protocol. Relinquishment of access to the unlicensed radio frequency spectrum band may be accomplished by, for example, stopping contention procedures or transmissions/receptions on the unlicensed radio frequency spectrum band for a period of time.

In cases where the base stations of different operators have asynchronous timings, fair access to an unlicensed radio frequency spectrum band may be facilitated by protecting some asynchronous transmissions (e.g., asynchronous CETs) in the unlicensed radio frequency spectrum band. In some wireless communication systems, the asynchronous transmissions of a first base station of a first operator and a second base station of a second operator may interfere with one another. In the case of some transmissions, such as CETs containing discovery signals, system information, or configuration information, a mobile device's failure to receive the transmissions may prevent the mobile device from receiving or transmitting data over an associated channel of the unlicensed radio frequency spectrum band. To increase the likelihood that mobile devices receive the CETs transmitted by their serving base station, the first base station of the first operator may discontinue transmissions during transmission timings of some transmissions (e.g., CETs) of the second base station of the second operator (where the second base station of the second operator is the serving base station in this example). Similarly, the second base station of the second operator may discontinue transmissions during transmission timings of some transmissions (e.g., CETs) of the first base station of the first operator (where the first base station of the first operator is the serving base station in this example). Although described with reference to two operators, it may be appreciated that the procedures and techniques described herein may apply to a plurality of operators.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1x EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The following description provides examples, and is not limiting of the scope, applicability, or examples set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 shows a block diagram of a wireless communication system 100, in accordance with various aspects of the present disclosure. The wireless communication system 100 may include a plurality of base stations 105 (e.g., base stations forming parts or all of one or more eNBs), a number of mobile devices 115 (e.g., user equipments (UEs)), and a core network 130. Some of the base stations 105 may communicate with the mobile devices 115 under the control of a base station controller (not shown), which may be part of the core network 130 or certain ones of the base stations 105 in various examples. Some of the base stations 105 may communicate control information or user data with the core network 130 through backhaul 132. In some examples, some of the base stations 105 may communicate, either directly or indirectly, with each other over backhaul links 134, which may be wired or wireless communication links. The wireless communication system 100 may support operation on multiple carriers (waveform signals of different frequencies). Multi-carrier transmitters can transmit modulated signals simultaneously on the multiple carriers. For example, each communication link 125 may be a multi-carrier signal modulated according to various radio technologies. Each modulated signal may be sent on a different carrier and may carry control information (e.g., reference signals, control channels, etc.), overhead information, data, etc.

The base stations 105 may wirelessly communicate with the mobile devices 115 via one or more base station antennas. Each of the base stations 105 may provide communication coverage for a respective coverage area 110. In some examples, a base station 105 may be referred to as an access point, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, a Wi-Fi node or some other suitable terminology. The coverage area 110 for a base station 105 may be divided into sectors making up only a portion of the coverage area. The wireless communication system 100 may include base stations 105 of different types (e.g., macro, micro, or pico base stations). The base stations 105 may also utilize different radio technologies, such as cellular or WLAN radio access technologies. The base stations 105 may be associated with the same or different access networks or operator deployments. The coverage areas of different base stations 105, including the coverage areas of the same or different types of base stations 105, utilizing the same or different radio technologies, or belonging to the same or different access networks, may overlap.

In some examples, the wireless communication system 100 may include an LTE/LTE-A communication system (or network), which LTE/LTE-A communication system may support one or more modes of operation or deployment in a licensed radio frequency spectrum band (e.g., a radio frequency spectrum band for which apparatuses do not contend for access because the spectrum band is licensed to particular users for particular uses) or an unlicensed radio frequency spectrum band (e.g., a radio frequency spectrum band such as a Wi-Fi radio frequency spectrum band, for which apparatuses contend for access because the radio frequency spectrum band is available for unlicensed use). In other examples, the wireless communication system 100 may support wireless communication using one or more access technologies different from LTE/LTE-A. In LTE/LTE-A communication systems, the term evolved NodeB or eNB may be, for example, used to describe ones or groups of the base stations 105.

The wireless communication system 100 may be or include a Heterogeneous LTE/LTE-A network in which different types of base stations 105 provide coverage for various geographical regions. For example, each base station 105 may provide communication coverage for a macro cell, a pico cell, a femto cell, or other type of cell. Small cells such as pico cells, femto cells, or other types of cells may include low power nodes or LPNs. A macro cell, for example, covers a relatively large geographic area (e.g., several kilometers in radius) and may allow unrestricted access by UEs with service subscriptions with the network provider. A pico cell would, for example, cover a relatively smaller geographic area and may allow unrestricted access by UEs with service subscriptions with the network provider. A femto cell would also, for example, cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the base stations 105 via a backhaul 132 (e.g., S1 application protocol, etc.). The base stations 105 may also communicate with one another, e.g., directly or indirectly via backhaul links 134 (e.g., X2 application protocol, etc.) or via backhaul 132 (e.g., through core network 130). The wireless communication system 100 may support synchronous or asynchronous operation. For synchronous operation, the eNBs may have similar frame or gating timing, and transmissions from different eNBs may be approximately aligned in time. For asynchronous operation, the eNBs may have different frame or gating timing, and transmissions from different eNBs may not be aligned in time.

The mobile devices 115 may be dispersed throughout the wireless communication system 100. A mobile device 115 may also be referred to by those skilled in the art as a user equipment (UE), a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A mobile device 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A mobile device 115 may be able to communicate with macro eNBs, pico eNBs, femto eNBs, relays, and the like. A mobile device 115 may also be able to communicate over different types of access networks, such as cellular or other WWAN access networks, or WLAN access networks. In some modes of communication with a mobile device 115, communication may be conducted over a plurality of communication links 125 or channels (i.e., component carriers), with each channel using a component carrier between the mobile device 115 and one of a number of cells (e.g., serving cells, which cells may in some cases be operated by different base stations 105).

Each component carrier may be provided over a licensed radio frequency spectrum band or an unlicensed radio frequency spectrum band, and a set of component carriers used in a particular mode of communication may all be received (e.g., at a mobile device 115) over a licensed radio frequency spectrum band, all be received (e.g., at a mobile device 115) over an unlicensed radio frequency spectrum band, or be received (e.g., at a mobile device 115) over a combination of a licensed radio frequency spectrum band and an unlicensed radio frequency spectrum.

The communication links 125 shown in wireless communication system 100 may include uplink channels (using component carriers) for carrying uplink (UL) communications (e.g., transmissions from a mobile device 115 to a base station 105) or downlink channels (using component carriers) for carrying downlink (DL) communications (e.g., transmissions from a base station 105 to a mobile device 115). The UL communications or transmissions may also be called reverse link communications or transmissions, while the DL communications or transmissions may also be called forward link communications or transmissions. The downlink communications or uplink communications may be made using a licensed radio frequency spectrum band, an unlicensed radio frequency spectrum band, or both.

In some examples of the wireless communication system 100, LTE/LTE-A may be deployed under different scenarios using an unlicensed radio frequency spectrum band. The deployment scenarios may include a supplemental downlink mode in which LTE/LTE-A downlink communications in a licensed radio frequency spectrum band may be offloaded to an unlicensed radio frequency spectrum band, a carrier aggregation mode in which both LTE/LTE-A downlink and uplink communications may be offloaded from a licensed radio frequency spectrum band to an unlicensed radio frequency spectrum band, and a standalone mode in which LTE/LTE-A downlink and uplink communications between a base station and a mobile device may take place in an unlicensed radio frequency spectrum band. Base stations 105 as well as mobile devices 115 may in some examples support one or more of these or similar modes of operation. OFDMA waveforms may be used in the communication links 125 for LTE/LTE-A downlink communications in a licensed radio frequency spectrum band or an unlicensed radio frequency spectrum band, while OFDMA, SC-FDMA or resource block interleaved FDMA waveforms may be used in the communication links 125 for LTE/LTE-A uplink communications in a licensed radio frequency spectrum band or an unlicensed radio frequency spectrum band.

In some examples of the wireless communication system 100, an apparatus seeking to transmit using an unlicensed radio frequency spectrum band may be required to verify that the unlicensed radio frequency spectrum band is available for use in such a transmission, that is, the unlicensed radio frequency spectrum band is not already in use by one or more other apparatuses. Thus, prior to accessing the unlicensed radio frequency spectrum band, an apparatus may perform a contention-based channel access procedure, also referred to as an LBT procedure, in order to gain channel access. For example, a CCA may be used to contend for access to the unlicensed radio frequency spectrum band. Performance of a CCA may involve checking that the unlicensed radio frequency spectrum band is not otherwise occupied prior to initiating transmissions. In some examples, CCA opportunities may be coordinated across multiple base stations 105 of an operator, and may occur at periodic intervals, such as every ten milliseconds, five milliseconds, two milliseconds, etc. A transmitting apparatus, such as a base station 105, may desire channel access and may perform CCA to determine if a particular carrier frequency (e.g., component carrier) in the unlicensed radio frequency spectrum band is occupied. If the particular carrier frequency in the unlicensed radio frequency spectrum band is occupied, the base station may wait until the next CCA opportunity before attempting to obtain access to the particular carrier frequency in the unlicensed radio frequency spectrum band. In deployments that provide CCA opportunities once every ten milliseconds, the base station 105 would then have to wait ten milliseconds before again attempting channel access in the unlicensed radio frequency spectrum band.

In some examples, and as noted previously, multiple operators may provide coordinated base stations 105 that may perform CCA procedures at predefined times in a contention-based procedure for access to an unlicensed radio frequency spectrum band. A base station 105 that does not win access to a channel of the unlicensed radio frequency spectrum band during the first CCA procedure may then wait the defined time period (e.g., an LBT frame period) for the next coordinated CCA opportunity. A base station 105 that does win access to the channel of the unlicensed radio frequency spectrum band may transmit radio signals using the channel of the unlicensed radio frequency spectrum band. As also noted previously, in situations where one or more base stations 105 of different operators may operate asynchronously and perform CCA procedures at predefined times, such base stations 105 may be precluded from channel access for a relatively long period of time. According to some examples, a base station 105 that wins the radio frequency spectrum band in a CCA procedure may relinquish access to the channel of the unlicensed radio frequency spectrum band after successfully contending for access to the unlicensed radio frequency spectrum band for a threshold number of consecutive LBT frames. This may allow one or more asynchronously operating base stations 105 to gain access to the channel of the unlicensed radio frequency spectrum band.

In one aspect, FIG. 1 illustrates an example of neighboring base stations 105-a and 105-b and associated mobile devices 115-a and 115-b. A first base station 105-a and a second base station 105-b may have overlapping coverage areas, such as a first coverage area 110-a and a second coverage area 110-b, respectively. In this example, first base station 105-a may communicate with a first mobile device 115-a using a first communication link 125-a in an unlicensed radio frequency spectrum band. Similarly, the second base station 105-b may communicate with a second mobile device 115-b using a second communication link 125-b in an unlicensed radio frequency spectrum band. According to some deployments, the first base station 105-a and the first mobile device 115-a may be deployed in a first operator's network and may be coordinated and contend for the unlicensed radio frequency spectrum band independently on each synchronous frame during a contention period that is coordinated among the base stations 105 of the first operator. Further, in some deployments, the second base station 105-b and the second mobile device 115-b may be deployed in a second operator's network and may be coordinated and contend for the unlicensed radio frequency spectrum band independently on each synchronous frame during a contention period that is coordinated among the base stations 105 of the second operator. As mentioned above, in examples where the first base station 105-a and first mobile device 115-a and the second base station 105-b and second mobile device 115-b are not synchronized, one of the operators may be precluded from accessing the unlicensed radio frequency spectrum band for a relatively long period of time if the coordinated contention periods are asynchronous. As is well understood, other users may also transmit signals in the unlicensed radio frequency spectrum band, including, for example, a Wi-Fi access point. A Wi-Fi access point may transmit Wi-Fi signals in the unlicensed radio frequency spectrum band.

As mentioned above, a Wi-Fi access point may communicate asynchronously with one or more other devices and may not have priority over any other devices seeking access to the unlicensed radio frequency spectrum band. Accordingly, a Wi-Fi access point may gain channel access to the unlicensed radio frequency spectrum band through standard LBT procedures used to access an unlicensed radio frequency spectrum band. In the event that the Wi-Fi access point is already transmitting during a CCA procedure of one or both of first base station 105-a or second base station 105-b, the Wi-Fi access point would retain access to the unlicensed radio frequency spectrum band, and the first base station 105-a and the second base station 105-b would not win contention to access the unlicensed radio frequency spectrum band until performing a successful CCA procedure.

Figure 2:
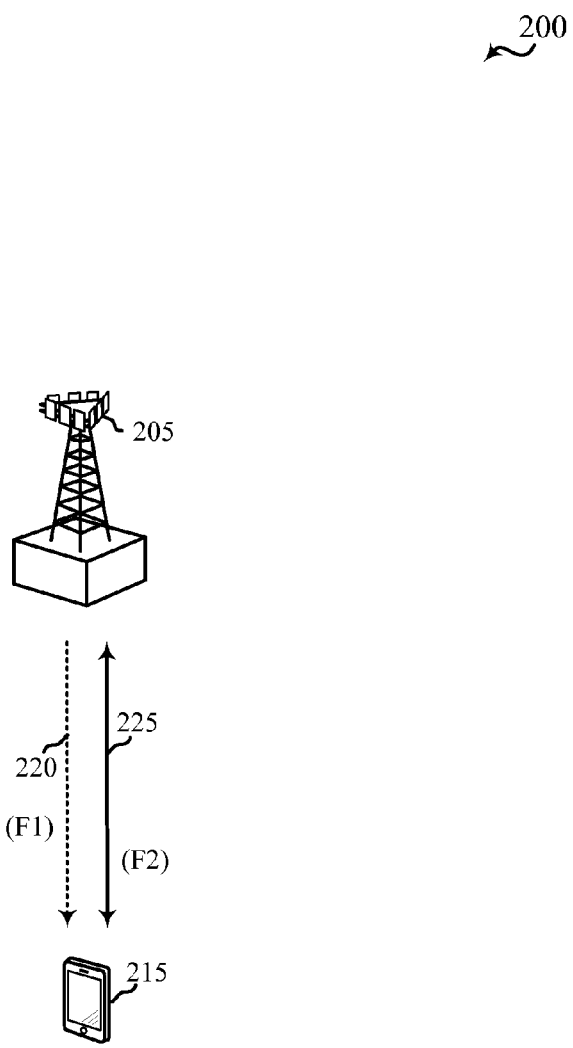
FIG. 2 shows a wireless communication system in which LTE/LTE-A is deployed in a supplemental downlink mode using an unlicensed radio frequency spectrum band, in accordance with various aspects of the present disclosure.

FIG. 2 shows a wireless communication system 200 in which LTE/LTE-A is deployed in a supplemental downlink mode using an unlicensed radio frequency spectrum band, in accordance with various aspects of the present disclosure. The wireless communication system 200 may be an example of portions of the wireless communication system 100 described with reference to FIG. 1. Moreover, the base station 205 may be an example of aspects of one or more of the base stations 105 described with reference to FIG. 1, while the mobile device 215 may be an example of aspects of one or more of the mobile devices 115 described with reference to FIG. 1.

In the example of a supplemental downlink mode in the wireless communication system 200, the base station 205 may transmit OFDMA waveforms to the mobile device 215 using a downlink channel 220. The downlink channel 220 may be associated with a frequency F1 in an unlicensed radio frequency spectrum band. The base station 205 may also transmit OFDMA waveforms to the mobile device 215 using a bidirectional link 225 and may receive SC-FDMA waveforms from the mobile device 215 using the bidirectional link 225. The bidirectional link 225 may be associated with a frequency F2 in a licensed radio frequency spectrum band. The downlink channel 220 in the unlicensed radio frequency spectrum band and the bidirectional link 225 in the licensed radio frequency spectrum band may operate concurrently. The downlink channel 220 may provide a downlink capacity offload for the base station 205. In some examples, the downlink channel 220 may be used for unicast services (e.g., addressed to one mobile device) or for multicast services (e.g., addressed to several mobile devices). This scenario may occur with any service provider (e.g., an MNO) that uses a licensed radio frequency spectrum band and needs to relieve some of the traffic or signaling congestion of the licensed radio frequency spectrum band.

In some examples, the bidirectional link 225 may be used for communications with a primary cell (Pcell), and the downlink channel 220 may be used for communications with a secondary cell (Scell). In a synchronized Pcell and Scell mode of operation, the Pcells of different operators may operate asynchronously with respect to their Pcells, such that an offset may need to be added to global positioning system (GPS)-derived timing. In an asynchronous Pcell and Scell mode of operation, a downlink control channel may be transmitted on the Scell or a modified timeline may be established for cross carrier grants. One approach may apply cross carrier grants to subsequent subframes due to the asynchronous timing offset. An asynchronous Pcell and Scell mode of operation may also require a modified timeline for uplink hybrid automatic repeat request (HARQ) feedback. The timeline may be rounded to a subframe boundary (e.g., delayed more than four milliseconds or advanced to three milliseconds or less).

As described above, one type of service provider that may benefit from the capacity offload offered by using LTE/LTE-A in an unlicensed radio frequency spectrum band is a traditional MNO having access rights to LTE/LTE-A a licensed radio frequency spectrum band. For these service providers, an operational example may include a boot-strapped mode (e.g., supplemental downlink) that uses an LTE/LTE-A primary component carrier (PCC) on a licensed radio frequency spectrum band and at least one secondary component carrier (SCC) on the unlicensed radio frequency spectrum band.

In some examples, a transmitting apparatus such as one of the base stations 105 or 205 described with reference to FIG. 1 or 2 may use a gating interval to gain access to a channel of an unlicensed radio frequency spectrum band (e.g., to a physical channel of the unlicensed radio frequency spectrum band). The gating interval may define the application of a contention-based protocol, such as an LBT protocol based on the LBT protocol specified in ETSI (EN 301 893). When using a gating interval that defines the application of an LBT protocol, the gating interval may indicate when a transmitting apparatus needs to perform a CCA. The outcome of the CCA may indicate to the transmitting device whether a channel of an unlicensed radio frequency spectrum band is available or in use for the gating interval (also referred to as an LBT frame). When a CCA indicates that the channel is available (e.g., "clear" for use) for a corresponding LBT frame, the transmitting apparatus may reserve or use the channel of the unlicensed radio frequency spectrum band during part or all of the LBT frame. When the CCA indicates that the channel is not available (e.g., that the channel is in use or reserved by another apparatus), the transmitting apparatus may be prevented from using the channel during the LBT frame.

In some cases, it may be useful for a transmitting apparatus to generate a gating interval on a periodic basis and synchronize at least one boundary of the gating interval with at least one boundary of a periodic frame structure. For example, it may be useful to generate a periodic gating interval for a cellular downlink in an unlicensed radio frequency spectrum band, and to synchronize at least one boundary of the periodic gating interval with at least one boundary of a periodic frame structure (e.g., a periodic LTE/LTE-A radio frame structure) associated with the cellular downlink. Examples of such synchronization are shown in FIG. 3.

Figure 3:
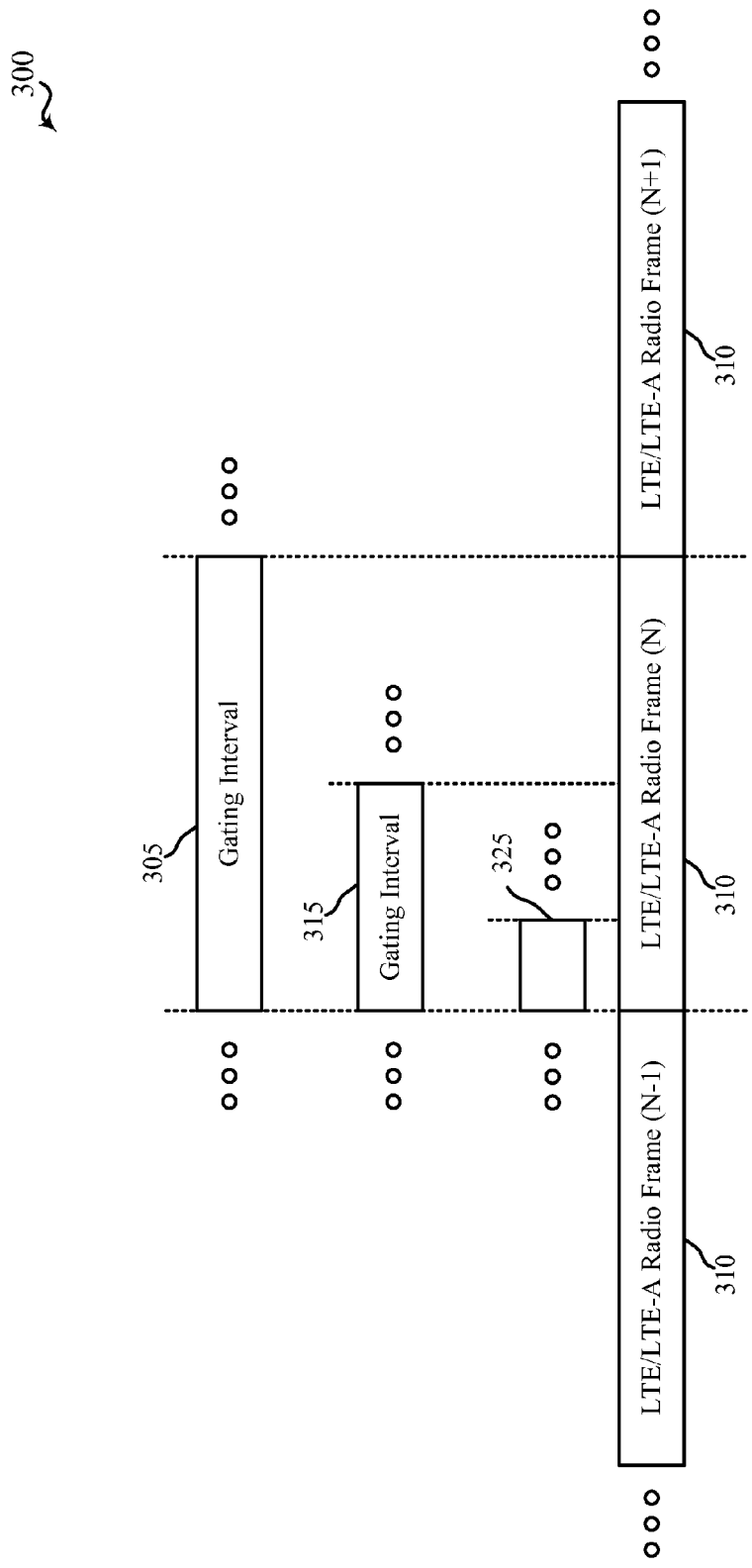
FIG. 3 shows examples of a gating interval (or LBT frame) for a cellular downlink in an unlicensed radio frequency spectrum band, in accordance with various aspects of the present disclosure.

FIG. 3 shows examples 300 of a gating interval (or LBT frame) for a cellular downlink in an unlicensed radio frequency spectrum band, in accordance with various aspects of the present disclosure. The first gating interval 305, the second gating interval 315, or the third gating interval 325 may be used as a periodic gating interval by an eNB that supports transmissions over the unlicensed radio frequency spectrum band. Examples of such an eNB may include the base stations 105 or 205 described with reference to FIG. 1 or 2. The first gating interval 305, the second gating interval 315, or the third gating interval 325 may be used with the wireless communication system 100 or 200 described with reference to FIG. 1 or 2.

By way of example, the duration of a first gating interval 305 is shown to be equal to (or approximately equal to) a duration of an LTE/LTE-A radio frame 310 of a periodic frame structure associated with a cellular downlink. In some examples, "approximately equal" means the duration of the first gating interval 305 is within a cyclic prefix (CP) duration of the duration of the periodic frame structure.

At least one boundary of the first gating interval 305 may be synchronized with at least one boundary of the periodic frame structure that includes the LTE/LTE-A radio frames N−1 to N+1. In some cases, the first gating interval 305 may have boundaries that are aligned with the frame boundaries of the periodic frame structure. In other cases, the first gating interval 305 may have boundaries that are synchronized with, but offset from, the frame boundaries of the periodic frame structure. For example, the boundaries of the first gating interval 305 may be aligned with subframe boundaries of the periodic frame structure, or with subframe midpoint boundaries (e.g., the midpoints of particular subframes) of the periodic frame structure.

In some cases, the periodic frame structure may include LTE/LTE-A radio frames N−1 to N+1. Each LTE/LTE-A radio frame 310 may have a duration of ten milliseconds, for example, and the first gating interval 305 may also have a duration of ten milliseconds. In these cases, the boundaries of the first gating interval 305 may be synchronized with the boundaries (e.g., frame boundaries, subframe boundaries, or subframe midpoint boundaries) of one of the LTE/LTE-A radio frames (e.g., the LTE/LTE-A radio frame (N)).

By way of example, the durations of a second gating interval 315 and a third gating interval 325 are shown to be sub-multiples of (or approximate sub-multiples of) the duration of the periodic frame structure associated with the cellular downlink. In some examples, an "approximate sub-multiple of" means the duration of the second gating interval 315 or the third gating interval 325 is within a cyclic prefix (CP) duration of the duration of a sub-multiple of (e.g., half or one-tenth) the periodic frame structure. For example, the second gating interval 315 may have a duration of five milliseconds and the third gating interval 325 may have a duration of two milliseconds. The second gating interval 315 or the third gating interval 325 may be advantageous over the first gating interval 305 because of its shorter duration, which may facilitate more frequent sharing of an unlicensed radio frequency spectrum band according to the N/K protocol discussed herein.

CCA procedures may be performed at the beginning of the gating intervals (e.g., the first gating interval 305, the second gating interval 315, or the third gating interval 325). In some examples, the CCA procedures may be performed during a number of symbols at the beginning of the gating intervals (e.g., the first gating interval 305, the second gating interval 315, or the third gating interval 325). A number of symbols for performing the CCA procedures may depend on a duration of a gating interval (e.g., the first gating interval 305, the second gating interval 315, or the third gating interval 325). In some examples, a number of symbols for performing the CCA procedures may be at least five percent of the duration of a gating interval (e.g., five percent of the duration of the first gating interval 305, the second gating interval 315, or the third gating interval 325). Following the CCA procedures (e.g., immediately after the OFDM symbols for the CCA procedures), one or more OFDM symbols may be used to transmit a signal (e.g., a channel usage beacon signal (CUBS)) to indicate winning the contention to access an unlicensed radio frequency spectrum band. For example, the one or more OFDM symbols used to transmit the signal to indicate winning the contention to access the unlicensed radio frequency spectrum band may be transmitted at a fixed transmission time (e.g., a transmission time that does not vary with time). The signal transmitted to indicate winning the contention to access the unlicensed radio frequency spectrum band may in some examples be transmitted by a base station and enable a mobile station to synchronize with the base station. Also, the signal transmitted to indicate winning the contention to access the unlicensed radio frequency spectrum band may include various information related to a telecommunication network.

In the case of a five millisecond second gating interval 315 or LBT frame having five individual one millisecond subframes, and by way of example, a first subframe may include four OFDM symbols of silence for performing downlink CCA, and one or more OFDM symbols for transmitting a channel usage beacon signal (CUBS) when winning contention to access an unlicensed radio frequency spectrum band. The remaining OFDM symbols of the first subframe of the second gating interval 315 may be used for transmission of a PDSCH. The OFDM symbols of the second through fifth subframes of the second gating interval 315 may also be used for transmission of a PDSCH. In some cases, the PDSCH may start with an OFDM symbol of the second subframe. Alternately, CCA and CUBS for the second gating interval 315 may be relocated to the end of a five millisecond gating interval that precedes the second gating interval 315. Radio resource control (RRC) signaling may be used to address a per subframe dependent starting OFDM symbol for PDSCH. Alternately, the starting OFDM symbol for PDSCH may be dynamically indicated in a cross carrier grant. In some examples, the first n OFDM symbols of the second subframe of the second gating interval 315 may be optionally used for control channel transmission.

In a supplemental downlink mode of operation using an unlicensed radio frequency spectrum band, and in some examples, a base station may employ a five millisecond second gating interval 315 having five downlink subframes, with the last of the five subframes being a special subframe. The special subframe may have a portion reserved for performing a CCA procedure. In a time domain duplexing (TDD) mode of operation using an unlicensed radio frequency spectrum band, and in some examples, a base station may employ a five millisecond second gating interval 315 having a dynamically selected configuration of uplink subframes and downlink subframes, such as set of frames including a downlink subframe, a special subframe for performing an uplink CCA, and three uplink subframes.

In the case of a two millisecond third gating interval 325 or LBT frame, and by way of example, a first subframe may include two or fewer OFDM symbols of silence for performing downlink CCA, and one or more OFDM symbols for transmitting a CUBS. The remaining OFDM symbols of the first subframe of the third gating interval 325 may be used for transmission of a PDSCH. The OFDM symbols of the second subframe of the third gating interval 325 may also be used for transmission of a PDSCH. In some cases, the PDSCH may start with an OFDM symbol of the second subframe. Alternately, CCA and CUBS for the third gating interval 325 may be relocated to the end of a two millisecond gating interval that precedes the third gating interval 325. In some examples, the first n OFDM symbols of the second subframe of the third gating interval 325 may be optionally used for control channel transmission.

A two millisecond third gating interval 325 may be useful in that it may further reduce the overhead to protect CETs of other operators. A two millisecond third gating interval 325 may also minimize the delay to access an unlicensed radio frequency spectrum band. In a TDD mode of operation using an unlicensed radio frequency spectrum band, and in some examples, each of a number of two millisecond third gating intervals 325 may correspond to an uplink LBT frame or a downlink LBT frame.

A shorter gating interval, coupled with the application of an N/K protocol, may be more suitable for detection of radar signals. For example, a two millisecond gating interval and N/K protocol with N=4 and K=1 may be useful for FCC radar signal detection.

At the beginning of a gating interval or LBT frame (e.g., at the beginning of the first gating interval 305, the second gating interval 315, or the third gating interval 325), or at the end of a prior gating interval or LBT frame, a CCA may be performed by each of a number of base stations that are synchronized with the gating interval and desire to contend for access to the LBT frame. Upon winning access to the LBT frame, a base station may transmit a CUBS to reserve access to an unlicensed radio frequency spectrum band during the LBT frame or to enable one or more mobile devices to synchronize to the LBT frame. When the base stations of an operator are operated synchronously, but the base stations of different operators are operated asynchronously, the CUBS may have a fixed duration, because access to an unlicensed radio frequency spectrum band shared by different operators is governed by an asynchronous operation protocol (e.g., an N/K protocol) and not the detection of the CUBS.

In the case of asynchronous operators, in which transmissions of a first base station of a first operator are asynchronous to transmissions of a second base station of a second operator, the sharing of an unlicensed radio frequency spectrum band may be facilitated by use of an N/K protocol, in which a base station that successfully performs CCA for N consecutive LBT frames does not participate in an LBT procedure over the next K LBT frames. In this manner, for example, the second base station of the second operator may be provided an opportunity to gain access to a channel of the unlicensed radio frequency spectrum band despite there being no procedure to synchronously change the temporal order in which the CCAs of the first operator and the second operator are performed (i.e., the CCA priorities of the first operator and the second operator) from one LBT frame to a next LBT frame. Values of N may be, for example, 2, 3, 4, or 5 LBT frames, and values of K may be, for example, 0 or 1 LBT frame. The duration of an LBT frame may be, for example, ten, five, or two milliseconds, as represented by the respective gating intervals (e.g., first gating interval 305, second gating interval 315, and third gating interval 325). A ten millisecond first gating interval 305 or LBT frame corresponds to the duration of the LTE/LTE-A radio frame 310.

Figure 4:
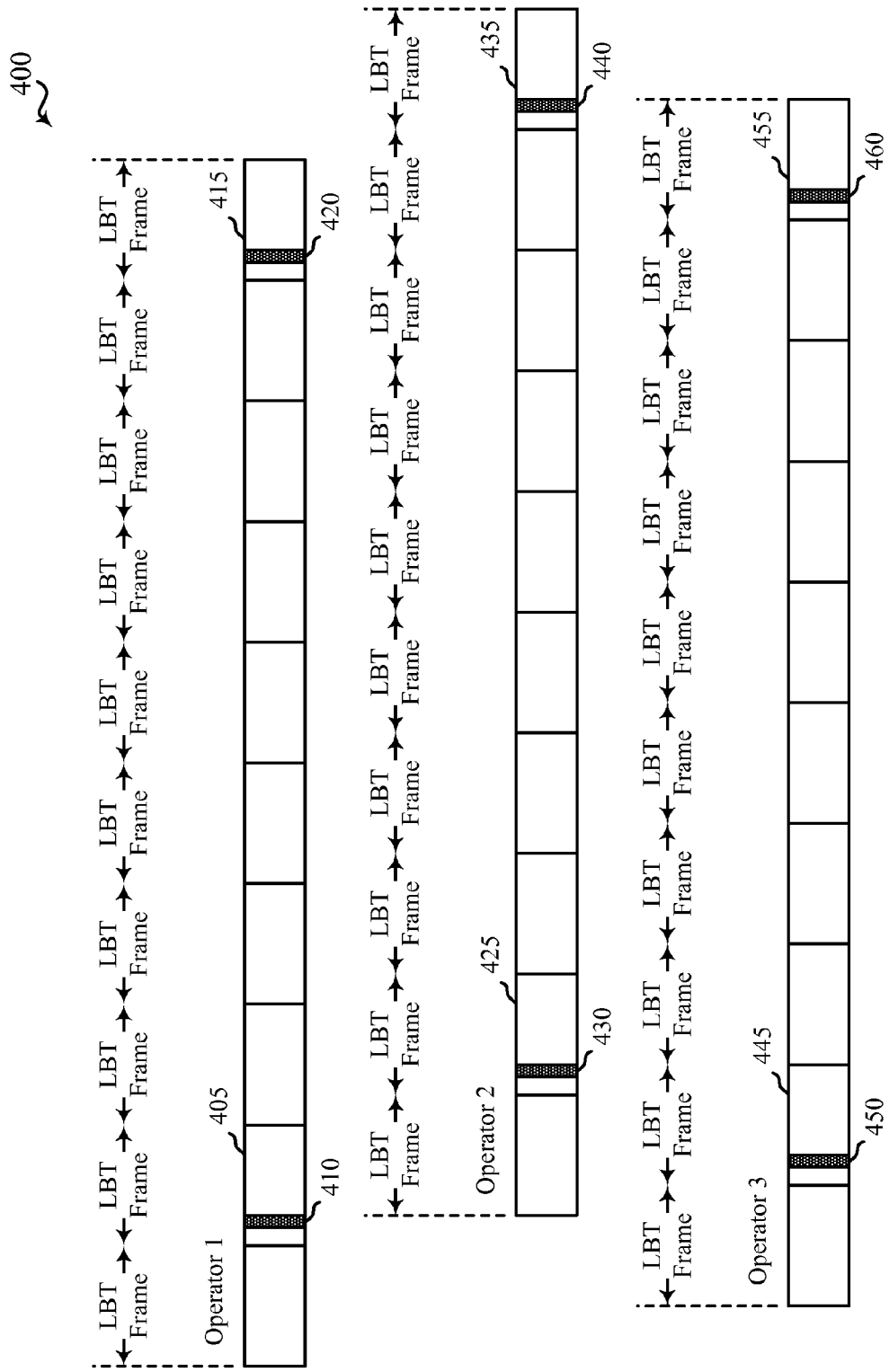
FIG. 4 shows an example of resource allocations for CET transmissions of asynchronous operators in an unlicensed radio frequency spectrum band, in accordance with various aspects of the present disclosure.

FIG. 4 shows an example 400 of resource allocations for CET transmissions of asynchronous operators (e.g., Operator 1, Operator 2, and Operator 3) in an unlicensed radio frequency spectrum band, in accordance with various aspects of the present disclosure. As shown, an allocation of resources for CETs may be made, for example, once every eighty milliseconds (80 ms). Therefore, when the length of an LBT frame is ten milliseconds, resources for CETs may be allocated in every eighth LBT frame (e.g., resources for a first CET 410 and a second CET 420 may be respectively allocated in a first LBT frame 405 and a second LBT frame 415 for Operator 1; resources for a third CET 430 and a fourth CET 440 may be respectively allocated in a third LBT frame 425 and a fourth LBT frame 435 for Operator 2; and resources for a fifth CET 450 and a sixth CET 460 may be respectively allocated in a fifth LBT frame 445 and a sixth LBT frame 455 for Operator 3). In alternate examples, the durations of the LBT frames may be shorter or longer, or CET resources may be allocated more or less often (e.g., once every fifty milliseconds, once every 160 milliseconds, or once every 320 milliseconds).

When transmitting a CET, the operators (e.g., Operator 1, Operator 2, and Operator 3) do not need to perform a CCA procedure to first gain access to the unlicensed radio frequency spectrum band. Instead, each of the operators (e.g., Operator 1, Operator 2, and Operator 3) is exempted from performing a CCA procedure for the purpose of transmitting the first CET 410, the second CET 420, the third CET 430, the fourth CET 440, the fifth CET 450, and the sixth CET 460.

Because the operators (e.g., Operator 1, Operator 2, and Operator 3) operate asynchronously, the timings of the first CET 410, the second CET 420, the third CET 430, the fourth CET 440, the fifth CET 450, and the sixth CET 460 of different operators are not confined to a particular CET period understood by all operators (e.g., Operator 1, Operator 2, and Operator 3), and may be separated by timing gaps. Such a structure may be applicable to both downlink subframes and uplink subframes.

In some examples, each CET may include discovery signals (e.g., synchronization signals or reference signals), system information, or configuration information. In some examples, the configuration information may be transmitted as part of an enhanced physical broadcast channel (ePBCH) or a physical downlink shared channel (PDSCH). In the case of a base station operated in a supplemental downlink mode using an unlicensed radio frequency spectrum band, a CET may in some cases include discovery signals plus a global cell identifier (i.e., a global cell ID). In the case of a base station operated in a standalone mode using an unlicensed radio frequency spectrum band, a CET may in some cases include a full set of system information and possibly paging channel information.

Figure 5:
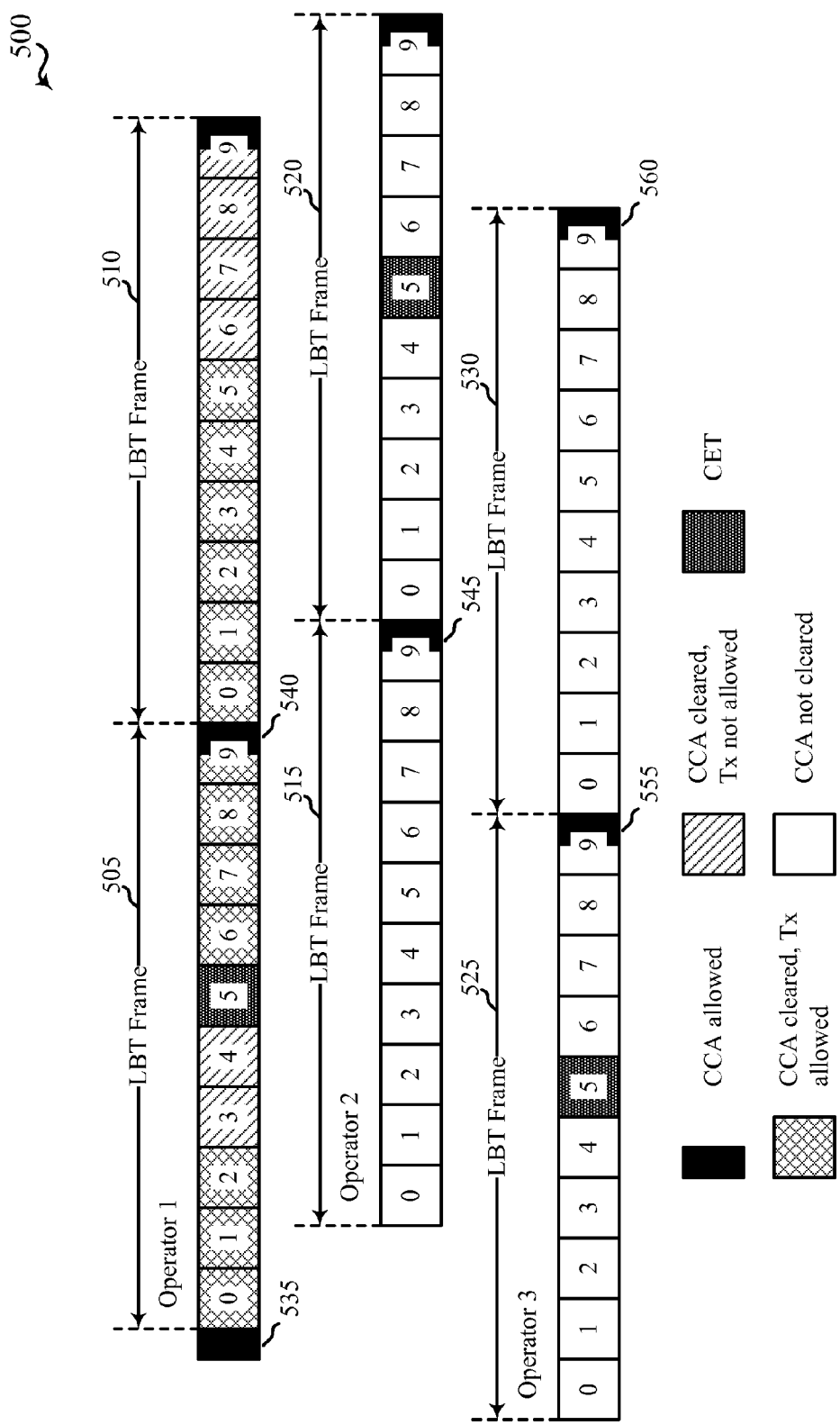
FIG. 5 shows example transmissions, over an unlicensed radio frequency spectrum band, of three base stations of three respective asynchronous operators (e.g., Operator 1, Operator 2, and Operator 3), in accordance with various aspects of the present disclosure.

FIG. 5 shows example transmissions 500, over an unlicensed radio frequency spectrum band, of three base stations of three respective asynchronous operators (e.g., Operator 1, Operator 2, and Operator 3), in accordance with various aspects of the present disclosure. As shown, Operator 1 may gain access to the unlicensed radio frequency spectrum band during a first LBT frame 505 after performing a CCA 535. However, because Operator 1 is aware that Operator 3 will transmit a CET during a subframe 5 of a fifth LBT frame 525, during parts of a subframe 3 and a subframe 4 of the first LBT frame 505, Operator 1 may discontinue transmissions during the subframe 3 and the subframe 4 of the first LBT frame 505. The discontinuation of transmissions may be limited to subframes (or other transmission periods) that overlap the CET of Operator 3, to limit overhead. During a subframe 5 of the first LBT frame 505, Operator 1 may transmit its own CET. Thereafter, Operator 1 may continue its transmissions over the unlicensed radio frequency spectrum band in a subframe 6, a subframe 7, a subframe 8, and part of a subframe 9 of the first LBT frame 505. In the latter part of the subframe 9 of the first LBT frame 505, Operator 1 may gain access to the unlicensed radio frequency spectrum band during a second LBT frame 510 after successfully performing a CCA 540. Because Operator 1 is aware that Operator 2 will transmit a CET during a subframe 5 of a fourth LBT frame 520, during parts of a subframe 6 and a subframe 7 of the second LBT frame 510, Operator 1 may discontinue transmissions during the subframe 6 and the subframe 7 of the second LBT frame 510. During a subframe 8 and a subframe 9 of the second LBT frame 510, and because the CCA 540 was performed to gain access to the entirety of the second LBT frame 510, Operator 1 may in some cases continue transmissions in the subframe 8 and the subframe 9. However, when Operator 1 discontinues transmissions during the subframe 6 and the subframe 7, there exists an opportunity for other devices to gain access to the unlicensed radio frequency spectrum band. For example, because the CET transmitted by Operator 2 does not fill the duration of the subframe 6 and the subframe 7, another transmitting apparatus (e.g., a Wi-Fi apparatus) may have an opportunity to perform CCA and gain access to the unlicensed radio frequency spectrum band. FIG. 5 assumes that a Wi-Fi apparatus (not shown) gains access to the unlicensed radio frequency spectrum band during the portion of the subframe 7 in which Operator 1, Operator 2, and Operator 3 are not transmitting. As a result, and by way of example, FIG. 5 shows Operator 1 to discontinue transmissions during the subframe 7, the subframe 8, and the subframe 9. Assuming that the Wi-Fi apparatus continues to transmit through the subframe 8 of the second LBT frame 510, the CCA 560 performed by Operator 3 during the subframe 9 of a sixth LBT frame 530 may not be successful. Thus, Operator 3 may not be able to gain access to a next LBT frame despite the fact that Operator 1 and Operator 2 do not have access to the unlicensed radio frequency spectrum band when Operator 3 performs the CCA 560.

Because of the asynchronous timings of the CCAs performed by Operator 1, Operator 2, and Operator 3, and the relationships of the timings of the CCAs 545, 550, 555, and 560, Operator 1 may prevent Operator 2 and Operator 3 from accessing the unlicensed radio frequency spectrum band during a third LBT frame 515, the fourth LBT frame 520, and the fifth LBT frame 525. However, if Operator 1 implements an N/K protocol with N=2 and K=1, Operator 1 may relinquish the unlicensed radio frequency spectrum band following the second LBT frame 510, thereby allowing Operator 2 to gain access to the unlicensed radio frequency spectrum band following the fourth LBT frame 520 (that is, assuming the Wi-Fi device that gained access to the unlicensed radio frequency spectrum band during the subframe 7 of the second LBT frame 510 has discontinued transmissions).

Because Operator 1 discontinues transmissions during the CET of Operator 2 in subframe 5 of the fourth LBT frame 520, and during the CET of Operator 3 in subframe 5 of the fifth LBT frame 525, mobile devices for which base stations of Operator 2 and Operator 3 function as serving base stations may be better able to detect the CETs of their respective serving base stations, due to reduced interference from a base station (or base stations) of Operator 1. CETs may in some cases be used for radio resource management (RRM) measurements, and therefore need to be detectable.

As described with reference to FIGS. 6-13, a first base station of a first operator may need to periodically discontinue transmissions over an unlicensed radio frequency spectrum band to monitor for CET timing information of a second base station of a second operator. After identifying transmission timings of CETs of the second base station of the second operator, the first base station of the first operator may discontinue transmissions during the transmission timings of the CETs of the second base station of the second operator (e.g., to protect the CETs of the second base station).

Protected CETs may include downlink CETs, and in some cases may include uplink CETs. CET timing information for uplink CETs of a base station may be advertised in downlink CETs of the base station.

Figure 6:
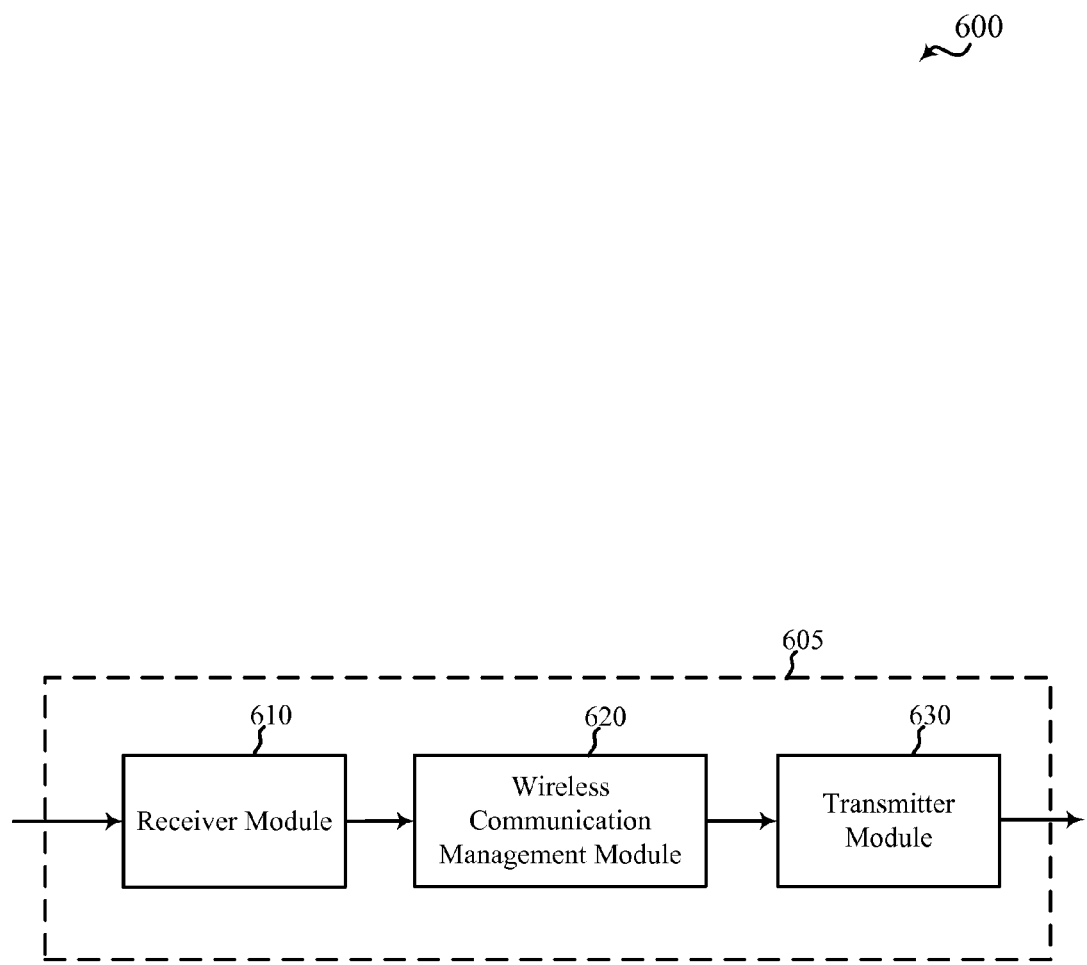
FIG. 6 shows a block diagram of an apparatus for use in wireless communication, in accordance with various aspects of the present disclosure.

FIG. 6 shows a block diagram 600 of an apparatus 605 for use in wireless communication, in accordance with various aspects of the present disclosure. In some examples, the apparatus 605 may be an example of one or more aspects of the base station 105 or 205 described with reference to FIG. 1 or 2. The apparatus 605 may also be an example of one or more aspects of the mobile device 115 or 215 described with reference to FIG. 1 or 2. The apparatus 605 may also be a processor. The apparatus 605 may include a receiver module 610, a wireless communication management module 620, or a transmitter module 630. Each of these components may be in communication with each other.

The components of the apparatus 605 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 610 may include at least one radio frequency (RF) receiver, such as at least one RF receiver operable to receive transmissions over a licensed radio frequency spectrum band (e.g., a radio frequency spectrum band for which apparatuses do not contend for access because the radio frequency spectrum band is licensed to particular users for particular uses) or an unlicensed radio frequency spectrum band (e.g., a radio frequency spectrum band such as a Wi-Fi radio frequency spectrum band, for which apparatuses may need to contend for access because the radio frequency spectrum band is available for unlicensed use). In some examples, both the licensed radio frequency spectrum band and the unlicensed radio frequency spectrum band may be used for LTE/LTE-A communications, as described, for example, with reference to FIG. 1 or 2. The receiver module 610 may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter module 630 may include at least one RF transmitter, such as at least one RF transmitter operable to transmit over the licensed radio frequency spectrum band or the unlicensed radio frequency spectrum band. The transmitter module 630 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In examples of the apparatus 605, in which the apparatus 605 is configured as a first base station of a first operator, the wireless communication management module 620 may be used by the apparatus 605 to monitor for CET timing information of a second base station of a second operator. The wireless communication management module 620 may then identify transmission timings of CETs of the second base station of the second operator based at least in part on the monitoring, and discontinue transmissions of the first base station of the first operator during the transmission timings of the CETs of the second base station of the second operator. Transmissions of the second base station of the second operator may be asynchronous to transmissions of the first base station of the first operator.

In some examples in which the apparatus 605 is configured as a first base station of a first operator, the wireless communication management module 620 may monitor for CET timing information by detecting the CET timing information directly from the second base station of the second operator. In the same or other examples, the wireless communication management module 620 may monitor for CET timing information by receiving a report from a mobile device located in a first cell of the first base station of the first operator. The wireless communication management module 620 may then identify the transmission timings of the CETs of the second base station of the second operator based at least in part on the report from the mobile device.

In examples of the apparatus 605, in which the apparatus 605 is configured as a mobile device, the wireless communication management module 620 may be used to generate the report from the mobile device. The report from the mobile device may take a variety of forms. In one example, the report from the mobile device may include a timing difference between the first base station of the first operator and the second base station of the second operator (e.g., a timing difference between a first PLMN of the first operator and a second PLMN of the second operator), wherein the mobile device is served by the first base station of the first operator. The timing difference may in some cases be reported as an system frame number (SFN), a subframe number difference, and a timing difference within a subframe. In another example, the report from the mobile device may include a timing difference between a reference CET timing and the transmission timings of the CETs of the second base station of the second operator. In yet the above and other examples, the report from the mobile device may include a PLMN identifier of the second operator, the mobile device being a member of a PLMN of the first operator. The PLMN identifier of the second operator enables the report to be indexed for use in identifying transmission timings of CETs of the second base station of the second operator.

Figure 7:
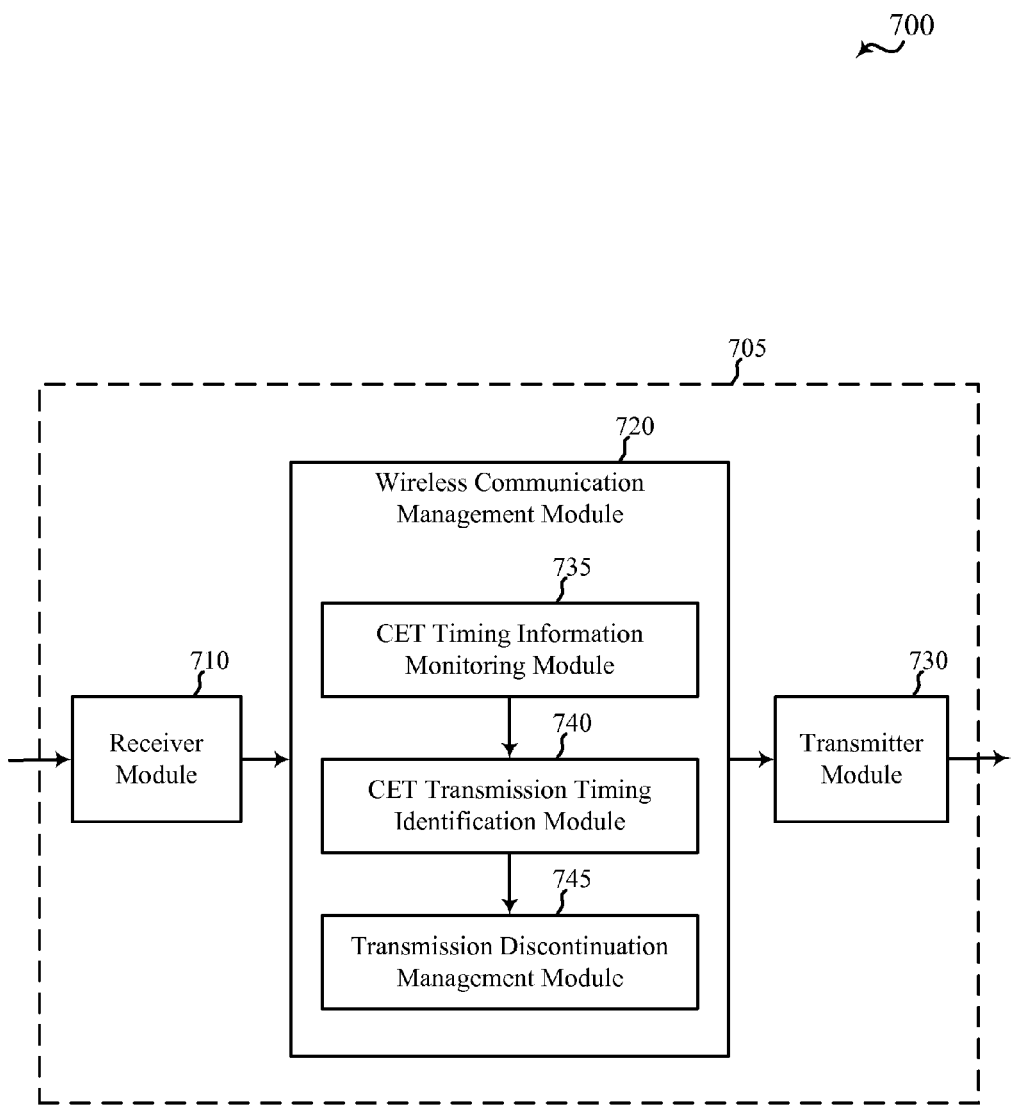
FIG. 7 shows a block diagram of an apparatus for use in wireless communication, in accordance with various aspects of the present disclosure.

FIG. 7 shows a block diagram 700 of an apparatus 705 for use in wireless communication, in accordance with various aspects of the present disclosure. In some examples, the apparatus 705 may be an example of one or more aspects of the base station 105 or 205 described with reference to FIG. 1 or 2, or an example of one or more aspects of the apparatus 605 described with reference to FIG. 6. The apparatus 705 may also be a processor. The apparatus 705 may include a receiver module 710, a wireless communication management module 720, or a transmitter module 730. Each of these components may be in communication with each other.

The components of the apparatus 705 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 710 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to particular users for particular uses) or an unlicensed radio frequency spectrum band (e.g., a radio frequency spectrum band such as a Wi-Fi radio frequency spectrum band, for which apparatuses may need to contend for access because the radio frequency spectrum band is available for unlicensed use). In some examples, both the licensed radio frequency spectrum band and the unlicensed radio frequency spectrum band may be used for LTE/LTE-A communications, as described, for example, with reference to FIG. 2. The receiver module 710 may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter module 730 may include at least one RF transmitter, such as at least one RF transmitter operable to transmit over the licensed radio frequency spectrum band or the unlicensed radio frequency spectrum band. The transmitter module 730 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the wireless communication management module 720 may be an example of one or more aspects of the wireless communication management module 620 described with reference to FIG. 6. The wireless communication management module 720 may include a CET timing information monitoring module 735, a CET transmission timing identification module 740, or a transmission discontinuation management module 745. Each of these components may be in communication with each other.

In some examples, the CET timing information monitoring module 735 may be used by a first base station of a first operator to monitor for CET timing information of a second base station of a second operator. Transmissions of the second base station of the second operator (including, for example, CETs) may be asynchronous to transmissions of the first base station of the first operator. In some examples, the first base station may be the base station 105 or 205 described with reference to FIG. 1 or 2.

In some examples, the CET transmission timing identification module 740 may be used to identify transmission timings of CETs of the second base station of the second operator based at least in part on the monitoring.

In some examples, the transmission discontinuation management module 745 may be used to discontinue the transmissions of the first base station of the first operator during the transmission timings of the CETs of the second base station of the second operator. In some examples, the transmission discontinuation management module 745 may discontinue transmissions for one or more LBT frames, subframes, or other transmission increments that overlap the transmission timings of the CETs of the second base station of the second operator.

In some examples of the apparatus 705, the transmission discontinuation management module 745 may discontinue the transmissions of the first base station of the first operator during the transmission timings of CETs of base stations of one or more operators (e.g., L operators). When the CET of each of L operators has a period of T(CET) milliseconds, the maximum overhead for discontinuing transmissions of the first base station of the first operator is 2L/T(CET) milliseconds, where the quantity 2L accounts for a CET of a base station of a second or additional operator overlapping two one millisecond subframes of the first base station of the first operator.

In some examples of the apparatus 705, the transmission discontinuation management module 745 may discontinue the transmissions of the first base station of the first operator during the transmission timings of both uplink and downlink CETs of base stations of one or more operators (e.g., L operators). When uplink and downlink CETs of each of L operators have a period of T(CET) milliseconds, the maximum overhead for discontinuing transmissions of the first base station of the first operator is 4L/T(CET) milliseconds (e.g., 2×2L/T(CET) milliseconds).

Figure 8:
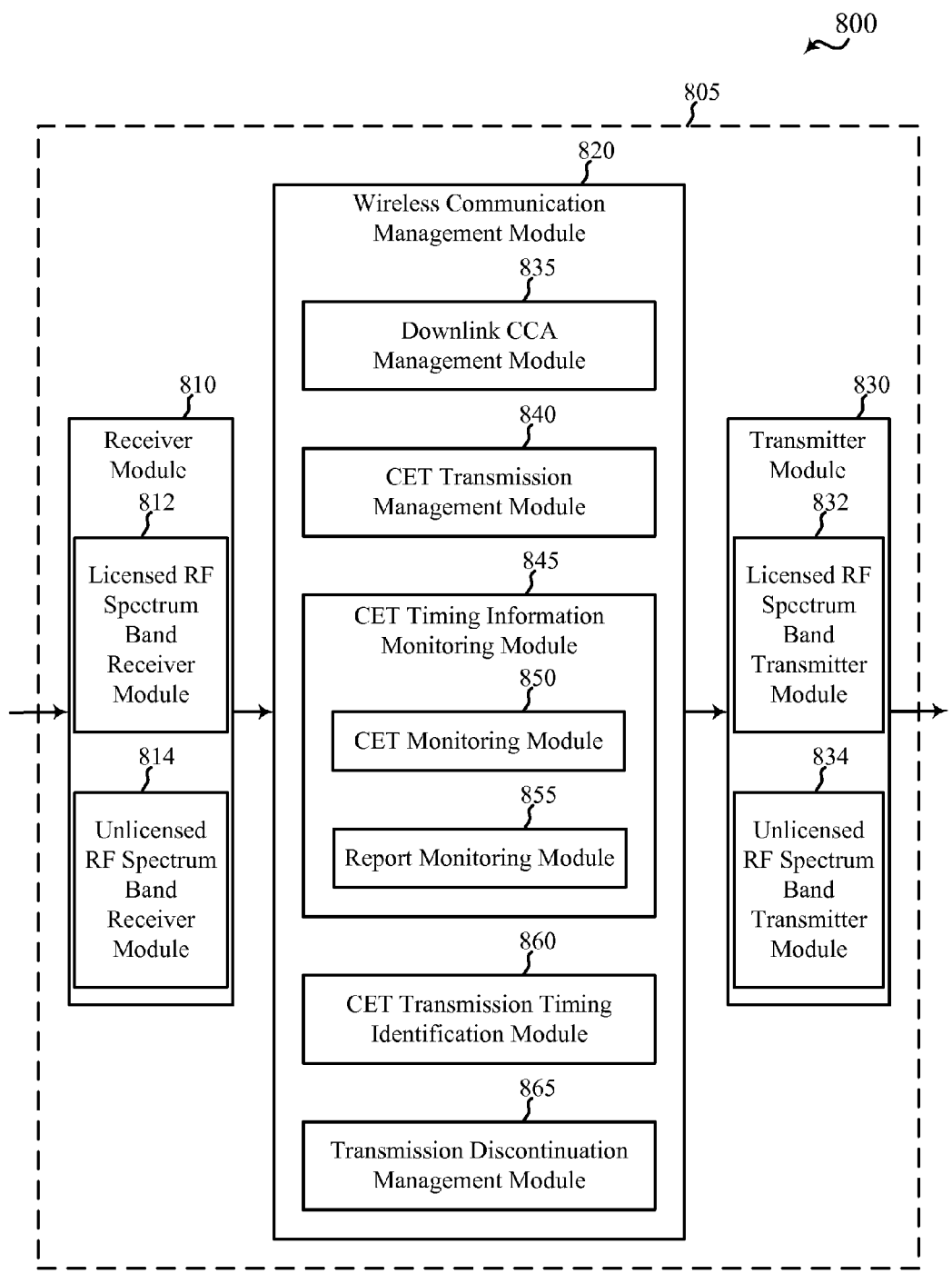
FIG. 8 shows a block diagram of an apparatus for use in wireless communication, in accordance with various aspects of the present disclosure.

FIG. 8 shows a block diagram 800 of an apparatus 805 for use in wireless communication, in accordance with various aspects of the present disclosure. In some examples, the apparatus 805 may be an example of one or more aspects of the base station 105 or 205 described with reference to FIG. 1 or 2, or one or more aspects of the apparatus 605 or 705 described with reference to FIG. 6 or 7. The apparatus 805 may also be a processor. The apparatus 805 may include a receiver module 810, a wireless communication management module 820, or a transmitter module 830. Each of these components may be in communication with each other.

The components of the apparatus 805 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 810 may include at least one RF receiver, such as at least one RF receiver operable to receive transmissions over licensed radio frequency spectrum band (e.g., a radio frequency spectrum band for which apparatuses do not contend for access because the radio frequency spectrum band is licensed to particular users for particular uses) or an unlicensed radio frequency spectrum band (e.g., a radio frequency spectrum band, such as Wi-Fi radio frequency spectrum band, for which apparatuses may need to contend for access because the radio frequency spectrum band is available for unlicensed use). In some examples, both the licensed radio frequency spectrum band and the unlicensed radio frequency spectrum band may be used for LTE/LTE-A communications, as described, for example, with reference to FIG. 2. The receiver module 810 may in some cases include separate receivers for the licensed radio frequency spectrum band and the unlicensed radio frequency spectrum band. The separate receivers may, in some examples, take the form of a licensed RF spectrum band receiver module 812 for communicating over the licensed radio frequency spectrum band, and an unlicensed RF spectrum band receiver module 814 for communicating over the unlicensed radio frequency spectrum band. The receiver module 810, including the licensed RF spectrum band receiver module 812 or the unlicensed RF spectrum band receiver module 814, may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter module 830 may include at least one RF transmitter, such as at least one RF transmitter operable to transmit over the licensed radio frequency spectrum band or the unlicensed radio frequency spectrum band. The transmitter module 830 may in some cases include separate transmitters for the licensed radio frequency spectrum band and the unlicensed radio frequency spectrum band. The separate transmitters may, in some examples, take the form of a licensed RF spectrum band transmitter module 832 for communicating over the licensed radio frequency spectrum band, and an unlicensed RF spectrum band transmitter module 834 for communicating over the unlicensed radio frequency spectrum band. The transmitter module 830, including the licensed RF spectrum band transmitter module 832 or the unlicensed RF spectrum band transmitter module 834, may be used to transmit various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the wireless communication management module 820 may be an example of one or more aspects of the wireless communication management module 620 or 720 described with reference to FIG. 6 or 7. The wireless communication management module 820 may include a downlink CCA management module 835, a CET transmission management module 840, a CET timing information monitoring module 845, a CET transmission timing identification module 860, or a transmission discontinuation management module 865. Each of these components may be in communication with each other.

The downlink CCA management module 835 may be used to perform a downlink CCA during a number of OFDM symbols of an LBT frame. By way of example, the LBT frame may have a duration of two milliseconds, five milliseconds, or ten milliseconds. The number of OFDM symbols may occur at a beginning of a first subframe of the LBT frame.

The CET transmission management module 840 may be used by a first base station of a first operator to transmit CETs of the first base station. The CETs of the first base station of the first operator may include system configuration information for the first base station of the first operator. In some examples, the first base station may be the base station 105 or 205 described with reference to FIG. 1 or 2. In some examples, the system configuration information for the first base station of the first operator may include information regarding a configuration of the LBT frame. In some examples, the information regarding the configuration of the LBT frame may indicate a duration of the LBT frame as two milliseconds, five milliseconds, or ten milliseconds.

The CET timing information monitoring module 845 may be used by a first base station of a first operator to monitor for CET timing information of a second base station of a second operator. Transmissions of the second base station of the second operator (including, for example, CETs) may be asynchronous to transmissions of the first base station of the first operator.

In some examples, the CET timing information monitoring module 845 may include a CET monitoring module 850 or a report monitoring module 855. In examples of the apparatus 805 including the CET monitoring module 850, the CET monitoring module 850 may be used to detect the CET timing information for the second base station of the second operator directly from the second base station of the second operator. The CET monitoring module 850 may also or alternately trigger a cessation of data transmissions of the first base station of the first operator during at least one time sub-interval of each of a plurality of time intervals to detect a transmission of a CET of the second base station of the second operator. For example, the CET monitoring module 850 may trigger a cessation of data transmissions of the first base station of the first operator during part or all of a CET period (e.g., for part or all of the CET period described with reference to FIG. 4) every M seconds (or minutes) to detect a transmission of a CET of the second base station of the second operator. In some examples, the at least one time sub-interval may change from a first of the plurality of time intervals to a second of the plurality of time intervals. For example, the CET monitoring module 850 may trigger a cessation of transmissions of the first base station of the first operator for a first K milliseconds of a CET period during one M second time interval, and may trigger a cessation of data transmissions for a different K milliseconds of the CET period during a next M second time interval.

In examples of the apparatus 805 including the report monitoring module 855, the report monitoring module 855 may be used to receive a report from a mobile device located in a first cell of the first base station of the first operator.

The report from the mobile device may take a variety of forms. In one example, the report from the mobile device may include a timing difference between the first base station of the first operator and the second base station of the second operator (e.g., a timing difference between a first PLMN of the first operator and a second PLMN of the second operator), wherein the mobile device is served by the first base station of the first operator. The timing difference may in some cases be reported as an SFN difference, a subframe number difference, and a timing difference within a subframe. In another example, the report from the mobile device may include a timing difference between a reference CET timing and the transmission timings of the CETs of the second base station of the second operator. In yet the above and other examples, the report from the mobile device may include a PLMN identifier of the second operator, the mobile device being a member of a PLMN of the first operator. The PLMN identifier of the second operator enables the report to be indexed for use in identifying transmission timings of CETs of the second base station of the second operator.

In some examples of the apparatus 805, the report from the mobile device may be received with a measurement report (e.g., a reference signal received power (RSRP), reference signal received quality (RSRQ), or other measurement report).

The CET transmission timing identification module 860 may be used to identify transmission timings of CETs of the second base station of the second operator based at least in part on the monitoring (and based at least in part on the report from the mobile device when such a report is received).

The transmission discontinuation management module 865 may be used to discontinue the transmissions of a cell of the first base station of the first operator during the transmission timings of the CETs of the second base station of the second operator. The cell may use an unlicensed radio frequency spectrum band that supports an SDL mode of operation. In some examples, the transmission discontinuation management module 865 may discontinue transmissions for one or more LBT frames, subframes, or other transmission increments that overlap the transmission timings of the CETs of the second base station of the second operator.

In some examples of the apparatus 805, the transmission discontinuation management module 865 may discontinue the transmissions of the first base station of the first operator during the transmission timings of CETs of base stations of one or more operators (e.g., L operators). When the CET of each of L operators has a period of T(CET) milliseconds, the maximum overhead for discontinuing transmissions of the first base station of the first operator is 2L/T(CET) milliseconds, where the quantity 2L accounts for a CET of a base station of a second or additional operator overlapping two one millisecond subframes of the first base station of the first operator.

In some examples of the apparatus 805, the transmission discontinuation management module 865 may discontinue the transmissions of the first base station of the first operator during the transmission timings of both uplink and downlink CETs of base stations of one or more operators (e.g., L operators). When uplink and downlink CETs of each of L operators have a period of T(CET) milliseconds, the maximum overhead for discontinuing transmissions of the first base station of the first operator is 4L/T(CET) milliseconds (e.g., 2×2L/T(CET) milliseconds).

Figure 9:
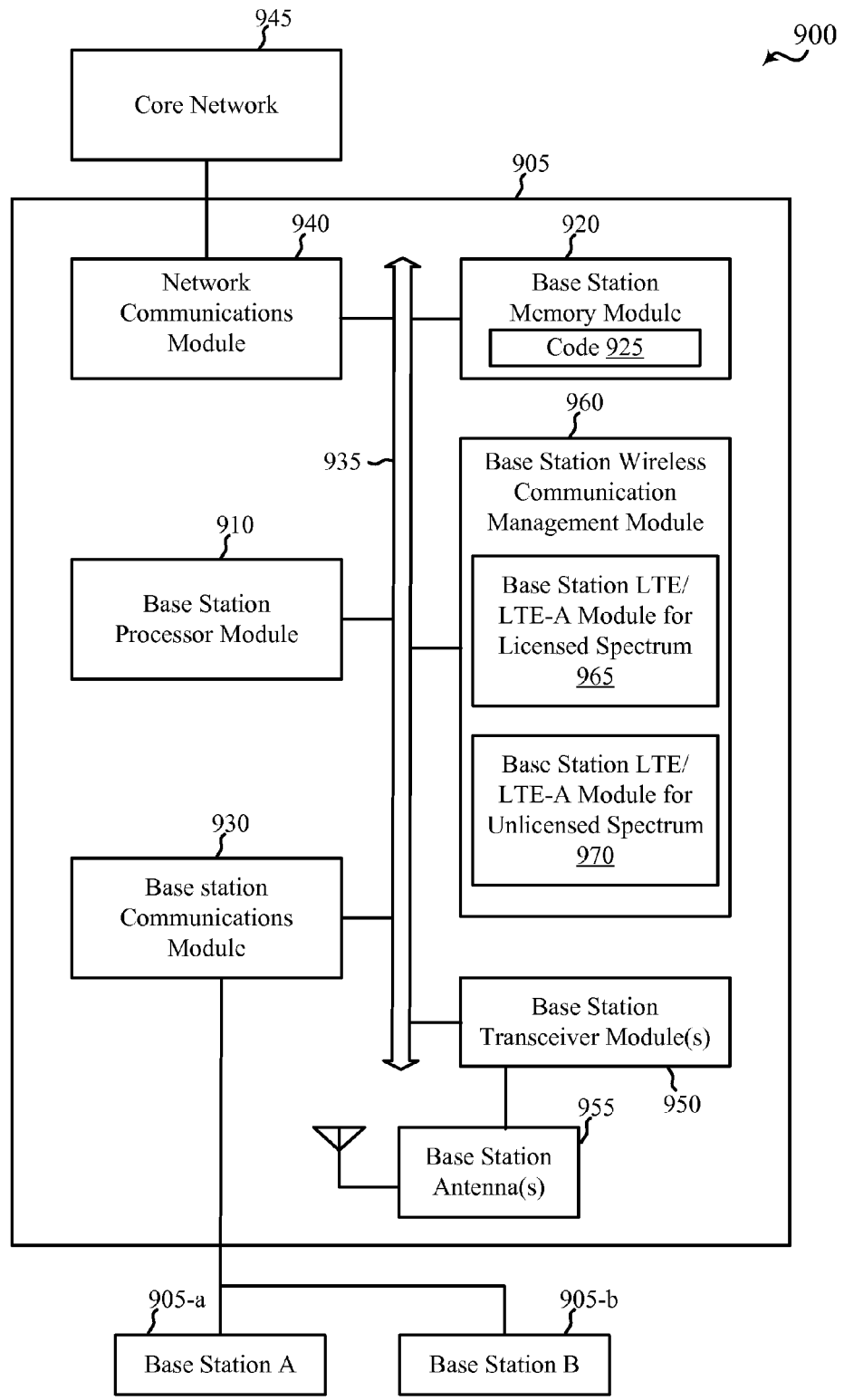
FIG. 9 shows a block diagram of a base station (e.g., a base station forming part or all of an eNB) for use in wireless communication, in accordance with various aspects of the present disclosure.

FIG. 9 shows a block diagram 900 of a base station 905 (e.g., a base station forming part or all of an eNB) for use in wireless communication, in accordance with various aspects of the present disclosure. In some examples, the base station 905 may be an example of one or more aspects of the base station 105 or 205 described with reference to FIG. 1 or 2, or one or more aspects of the apparatus 605, 705, or 805 described with reference to FIG. 6, 7, or 8 (e.g., when configured as a base station). The base station 905 may be configured to implement or facilitate at least some of the base station or apparatus features and functions described with reference to FIG. 1, 2, 3, 4, 5, 6, 7, or 8.

The base station 905 may include a base station processor module 910, a base station memory module 920, at least one base station transceiver module (represented by base station transceiver module(s) 950), at least one base station antenna (represented by base station antenna(s) 955), or a base station wireless communication management module 960. The base station 905 may also include one or more of a base station communications module 930 or a network communications module 940. Each of these components may be in communication with each other, directly or indirectly, over one or more buses 935.

The base station memory module 920 may include random access memory (RAM) or read-only memory (ROM). The base station memory module 920 may store computer-readable, computer-executable code 925 containing instructions that are configured to, when executed, cause the base station processor module 910 to perform various functions described herein related to wireless communication. Alternatively, the code 925 may not be directly executable by the base station processor module 910 but be configured to cause the base station 905 (e.g., when compiled and executed) to perform the various functions described herein.

The base station processor module 910 may include an intelligent hardware device, (e.g., a central processing unit (CPU), a microcontroller, an ASIC, etc.). The base station processor module 910 may process information received through the base station transceiver module(s) 950, the base station communications module 930, or the network communications module 940. The base station processor module 910 may also process information to be sent to the transceiver module(s) 950 for transmission through the antenna(s) 955, to the base station communications module 930, for transmission to one or more other base stations 905-a and 905-b, or to the network communications module 940 for transmission to a core network 945, which may be an example of one or more aspects of the core network 130 described with reference to FIG. 1. The base station processor module 910 may handle, alone or in connection with the base station wireless communication management module 960, various aspects of communicating over (or managing communications over) a first radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) or a second radio frequency spectrum band (e.g., a radio frequency spectrum band, such as Wi-Fi radio frequency spectrum band, for which apparatuses may need to contend for access because the radio frequency spectrum band is available for unlicensed use, such as an unlicensed radio frequency spectrum band usable for LTE/LTE-A communications).

The base station transceiver module(s) 950 may include a modem configured to modulate packets and provide the modulated packets to the base station antenna(s) 955 for transmission, and to demodulate packets received from the base station antenna(s) 955. The base station transceiver module(s) 950 may, in some examples, be implemented as one or more base station transmitter modules and one or more separate base station receiver modules. The base station transceiver module(s) 950 may support communications in the first radio frequency spectrum band or the second radio frequency spectrum band. The base station transceiver module(s) 950 may be configured to communicate bi-directionally, via the antenna(s) 955, with one or more mobile stations or apparatuses, such as one or more of the mobile devices 115 or 215 described with reference to FIG. 1 or 2, or the apparatus 605 described with reference to FIG. 6 configured as a mobile device, for example. The base station 905 may, for example, include multiple base station antennas 955 (e.g., an antenna array). The base station 905 may communicate with the core network 945 through the network communications module 940. The base station 905 may also communicate with other base stations, such as the base stations 905-a and 905-b, using the base station communications module 930.

The base station wireless communication management module 960 may be configured to perform or control some or all of the features or functions described with reference to FIG. 1, 2, 3, 5, 6, 7, or 8 related to wireless communication over the first radio frequency spectrum band or the second radio frequency spectrum band. For example, the base station wireless communication management module 960 may be configured to support a supplemental downlink mode using the first radio frequency spectrum band or the second radio frequency spectrum band. The base station wireless communication management module 960 may include a base station LTE/LTE-A licensed spectrum module 965 configured to handle LTE/LTE-A communications in the first radio frequency spectrum band, and a base station LTE/LTE-A unlicensed spectrum module 970 configured to handle LTE/LTE-A communications in the second radio frequency spectrum band. The base station wireless communication management module 960, or portions of it, may include a processor, or some or all of the functions of the base station wireless communication management module 960 may be performed by the base station processor module 910 or in connection with the base station processor module 910.

Figure 10:
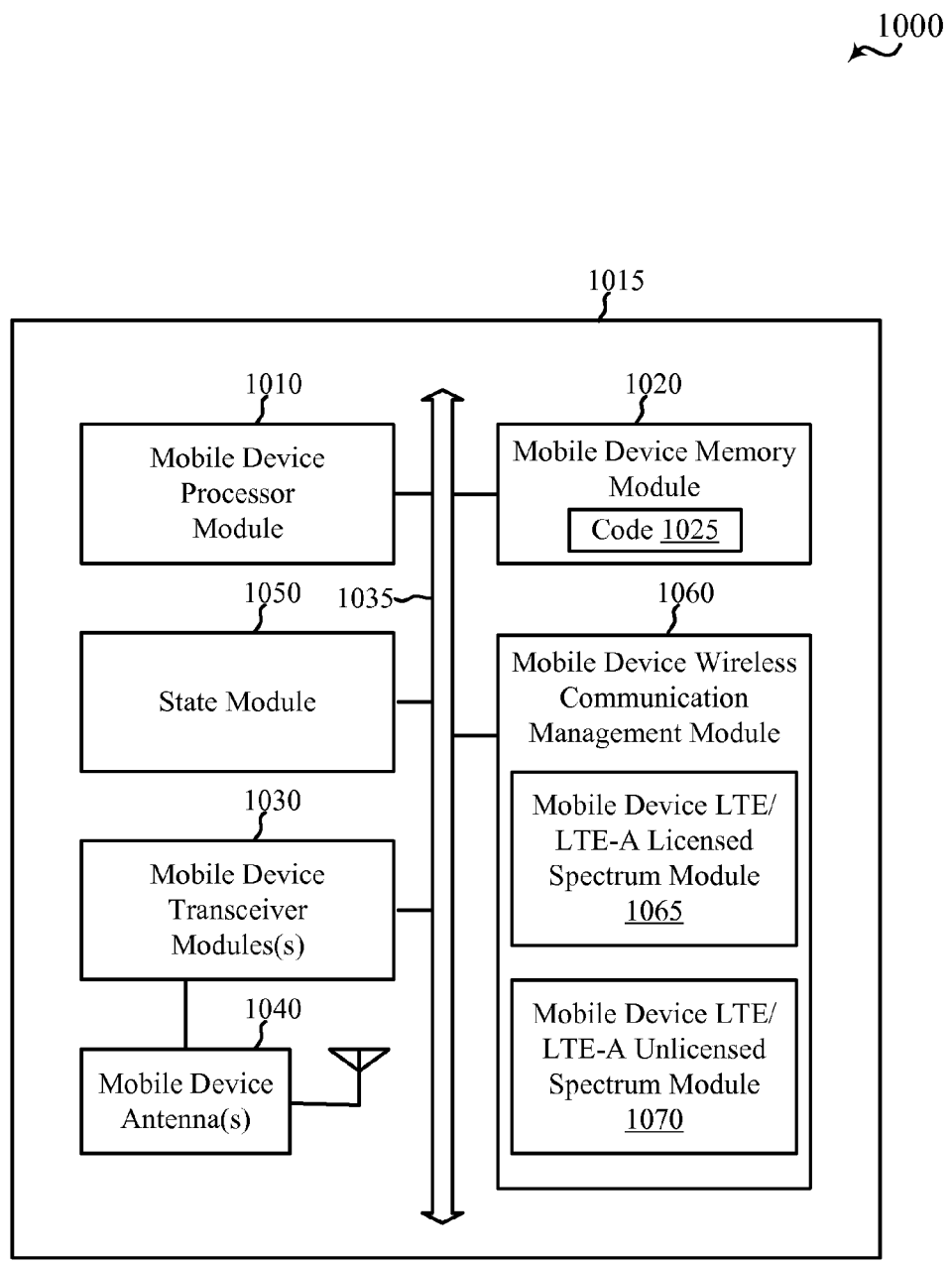
FIG. 10 shows a block diagram of a mobile device (e.g., a UE) for use in wireless communication, in accordance with various aspects of the present disclosure.

FIG. 10 shows a block diagram 1000 of a mobile device 1015 (e.g., a UE) for use in wireless communication, in accordance with various aspects of the present disclosure. The mobile device 1015 may have various configurations and may be included or be part of a personal computer (e.g., a laptop computer, a netbook computer, a tablet computer, etc.), a cellular telephone, a PDA, a digital video recorder (DVR), an internet appliance, a gaming console, an e-reader, etc. The mobile device 1015 may, in some examples, have an internal power supply (not shown), such as a small battery, to facilitate mobile operation. In some examples, the mobile device 1015 may be an example of one or more aspects of the mobile device 115 or 215 described with reference to FIG. 1 or 2, or one or more aspects of the apparatus 605 described with reference to FIG. 6. The mobile device 1015 may be configured to implement at least some of the mobile device or apparatus features and functions described with reference to FIG. 1, 2, 3, 5, or 6.

The mobile device 1015 may include a mobile device processor module 1010, a mobile device memory module 1020, at least one mobile device transceiver module (represented by mobile device transceiver module(s) 1030), at least one mobile device antenna (represented by mobile device antenna(s) 1040), or a mobile device wireless communication management module 1060. Each of these components may be in communication with each other, directly or indirectly, over one or more buses 1035.

The mobile device memory module 1020 may include RAM or ROM. The mobile device memory module 1020 may store computer-readable, computer-executable code 1025 containing instructions that are configured to, when executed, cause the mobile device processor module 1010 to perform various functions described herein related to handover, cell reselection, or an initial access procedure. Alternatively, the code 1025 may not be directly executable by the mobile device processor module 1010 but be configured to cause the mobile device 1015 (e.g., when compiled and executed) to perform various of the functions described herein.

The mobile device processor module 1010 may include an intelligent hardware device, (e.g., a CPU, a microcontroller, an ASIC, etc.). The mobile device processor module 1010 may process information received through the mobile device transceiver module(s) 1030 or information to be sent to the mobile device transceiver module(s) 1030 for transmission through the mobile device antenna(s) 1040. The mobile device processor module 1010 may handle, alone or in connection with the mobile device wireless communication management module 1060, various aspects of communicating over (or managing communications over) a first radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) or a second radio frequency spectrum band (e.g., a radio frequency spectrum band, such as Wi-Fi radio frequency spectrum band, for which apparatuses may need to contend for access because the radio frequency spectrum band is available for unlicensed use, such as an unlicensed radio frequency spectrum band usable for LTE/LTE-A communications).

The mobile device transceiver module(s) 1030 may include a modem configured to modulate packets and provide the modulated packets to the mobile device antenna(s) 1040 for transmission, and to demodulate packets received from the mobile device antenna(s) 1040. The mobile device transceiver module(s) 1030 may, in some examples, be implemented as one or more mobile device transmitter modules and one or more separate mobile device receiver modules. The mobile device transceiver module(s) 1030 may support communications in the first radio frequency spectrum band or the second radio frequency spectrum band. The mobile device transceiver module(s) 1030 may be configured to communicate bi-directionally, via the mobile device antenna(s) 1040, with one or more of the base stations 105 or 205 described with reference to FIG. 1 or 2, or the apparatus 605 described with reference to FIG. 6 (e.g., when configured as a base station). While the mobile device 1015 may include a single mobile device antenna, there may be examples in which the mobile device 1015 may include multiple mobile device antennas 1040.

The state module 1050 may be used, for example, to manage transitions of the mobile device 1015 between an RRC idle state and an RRC connected state, and may be in communication with other components of the mobile device 1015, directly or indirectly, over the one or more buses 1035. The state module 1050, or portions of it, may include a processor, or some or all of the functions of the state module 1050 may be performed by the mobile device processor module 1010 or in connection with the mobile device processor module 1010.

The mobile device wireless communication management module 1060 may be configured to perform or control some or all of the features or functions described with reference to FIG. 1, 2, 3, 5, or 6 related to wireless communication over the first radio frequency spectrum band or the second radio frequency spectrum band. For example, the mobile device wireless communication management module 1060 may be configured to support a supplemental downlink mode of operation using the first radio frequency spectrum band or the second radio frequency spectrum band. The mobile device wireless communication management module 1060 may include a mobile device LTE/LTE-A licensed spectrum module 1065 configured to handle LTE/LTE-A communications in the first radio frequency spectrum band, and a mobile device LTE/LTE-A unlicensed spectrum module 1070 configured to handle LTE/LTE-A communications in the second radio frequency spectrum. The mobile device wireless communication management module 1060, or portions of it, may include a processor, or some or all of the functions of the mobile device wireless communication management module 1060 may be performed by the mobile device processor module 1010 or in connection with the mobile device processor module 1010.

Figure 11:
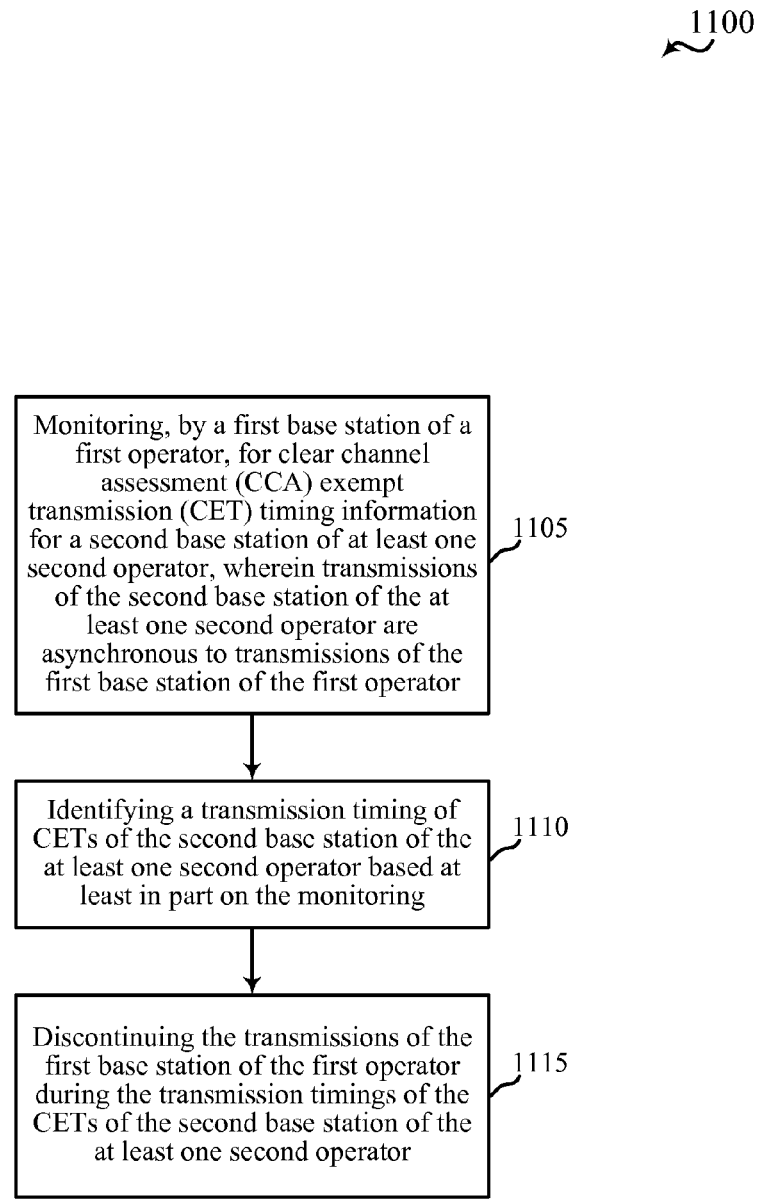
FIG. 11 is a flow chart illustrating an example of a method for wireless communication, in accordance with various aspects of the present disclosure.

FIG. 11 is a flow chart illustrating an example of a method 1100 for wireless communication, in accordance with various aspects of the present disclosure. For clarity, the method 1100 is described below with reference to aspects of one or more of the base stations 105, 205, or 905 described with reference to FIG. 1, 2, or 9, or one or more aspects of the apparatus 605, 705, or 805 described with reference to FIG.

6, 7, or 8. In some examples, a base station or apparatus may execute one or more sets of codes to control the functional elements of the base station or apparatus to perform the functions described below.

At block 1105, the method 1100 may include monitoring, by a first base station of a first operator, for CET timing information of a second base station of at least one second operator. Transmissions of the second base station of the at least one second operator (including, for example, CETs) may be asynchronous to transmissions of the first base station of the first operator. In some examples, the first base station may be the base station 105, 205, or 905 described with reference to FIG. 1, 2, or 9, or the first base station may include (or be included in) the apparatus 605, 705, or 805 described with reference to FIG. 6, 7, or 8. The operation(s) at block 1105 may be performed using the wireless communication management module 620, 720, or 820 described with reference to FIG. 6, 7, or 8, the CET timing information monitoring module 735 or 845 described with reference to FIG. 7 or 8, or the base station wireless communication management module 960 described with reference to FIG. 9.

At block 1110, the method 1100 may include identifying transmission timings of CETs of the second base station of the at least one second operator based at least in part on the monitoring. The operation(s) at block 1110 may be performed using the wireless communication management module 620, 720, or 820 described with reference to FIG. 6, 7, or 8, the CET transmission timing identification module 740 or 860 described with reference to FIG. 7 or 8, or the base station wireless communication management module 960 described with reference to FIG. 9.

At block 1115, the method 1100 may include discontinuing the transmissions of the first base station of the first operator during the transmission timings of the CETs of the second base station of the at least one second operator. In some examples, the transmissions may be discontinued for one or more LBT frames, subframes, or other transmission increments that overlap the transmission timings of the CETs of the second base station of the a least one second operator. The operation(s) at block 1115 may be performed using the wireless communication management module 620, 720, or 820 described with reference to FIG. 6, 7, or 8, the transmission discontinuation management module 745 or 865 described with reference to FIG. 7 or 8, or the base station wireless communication management module 960 described with reference to FIG. 9.

In some examples of the method 1100, the method 1100 may include discontinuing the transmissions of the first base station of the first operator during the transmission timings of CETs of base stations of one or more operators (e.g., L operators). When the CET of each of L operators has a period of T(CET) milliseconds, the maximum overhead for discontinuing transmissions of the first base station of the first operator is 2L/T(CET) milliseconds, where the quantity 2L accounts for a CET of a base station of a second or additional operator overlapping two one millisecond subframes of the first base station of the first operator.

In some examples of the method 1100, the method 1100 may include discontinuing the transmissions of the first base station of the first operator during the transmission timings of both uplink and downlink CETs of base stations of one or more operators (e.g., L operators). When uplink and downlink CETs of each of L operators have a period of T(CET) milliseconds, the maximum overhead for discontinuing transmissions of the first base station of the first operator is 4L/T(CET) milliseconds (e.g., 2×2L/T(CET) milliseconds).

Thus, the method 1100 may provide for wireless communication. It should be noted that the method 1100 is just one implementation and that the operations of the method 1100 may be rearranged or otherwise modified such that other implementations are possible.

Figure 12:
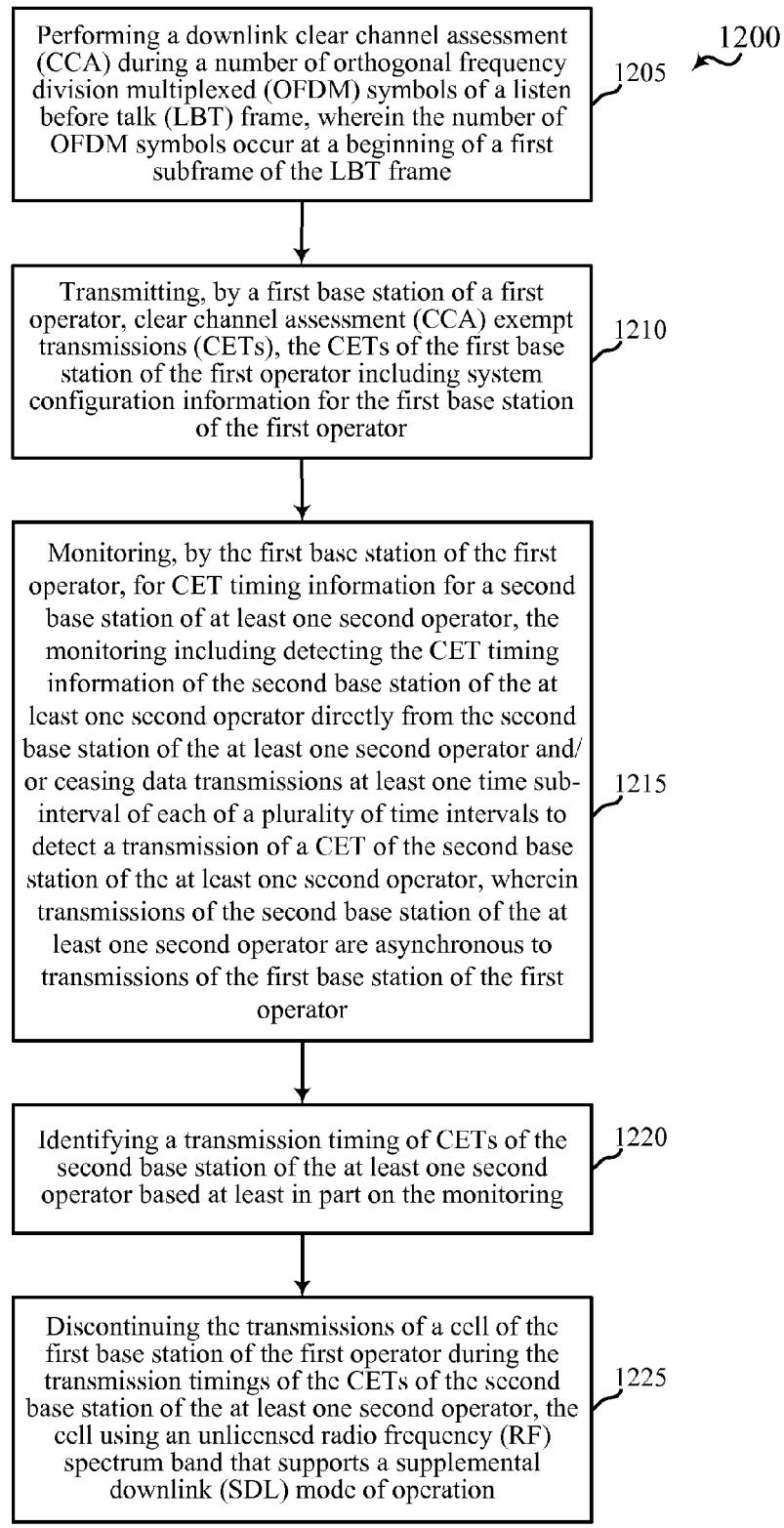
FIG. 12 is a flow chart illustrating an example of a method for wireless communication, in accordance with various aspects of the present disclosure.

FIG. 12 is a flow chart illustrating an example of a method 1200 for wireless communication, in accordance with various aspects of the present disclosure. For clarity, the method 1200 is described below with reference to aspects of one or more of the base stations 105, 205, or 905 described with reference to FIG. 1, 2, or 9, or one or more aspects of the apparatus 605, 705, or 805 described with reference to FIG. 6, 7, or 8. In some examples, a base station or apparatus may execute one or more sets of codes to control the functional elements of the base station or apparatus to perform the functions described below.

At block 1205, the method 1200 may include performing a downlink CCA during a number of OFDM symbols of an LBT frame. By way of example, the LBT frame may have a duration of two milliseconds, five milliseconds, or ten milliseconds. The number of OFDM symbols may occur at a beginning of a first subframe of the LBT frame. The operation(s) at block 1205 may be performed using the wireless communication management module 620, 720, or 820 described with reference to FIG. 6, 7, or 8, the downlink CCA management module 835 described with reference to FIG. 8, or the base station wireless communication management module 960 described with reference to FIG. 9.

At block 1210, the method 1200 may include transmitting, by a first base station of a first operator, CETs of the first base station. The CETs of the first base station of the first operator may include system configuration information for the first base station of the first operator. In some examples, the first base station may be the base station 105, 205, or 905 described with reference to FIG. 1, 2, or 9, or the first base station may include (or be included in) the apparatus 605, 705, or 805 described with reference to FIG. 6, 7, or 8. In some examples, the system configuration information for the first base station of the first operator may include information regarding a configuration of the LBT frame. In some examples, the information regarding the configuration of the LBT frame may indicate a duration of the LBT frame as two milliseconds, five milliseconds, or ten milliseconds. The operation(s) at block 1210 may be performed using the wireless communication management module 620, 720, or 820 described with reference to FIG. 6, 7, or 8, the CET transmission management module 840 described with reference to FIG. 8, or the base station wireless communication management module 960 described with reference to FIG. 9.

At block 1215, the method 1200 may include monitoring, by a first base station of a first operator, for CET timing information of a second base station of at least one second operator. Transmissions of the second base station of the at least one second operator (including, for example, CETs) may be asynchronous to transmissions of the first base station of the first operator. The monitoring may include detecting the CET timing information for the second base station of the at least one second operator directly from the second base station of the at least one second operator. The monitoring may also or alternately include ceasing data transmissions of the first base station of the first operator during at least one time sub-interval of each of a plurality of time intervals to detect a transmission of a CET of the second base station of the at least one second operator. For example, the first base station of the first operator may cease data transmissions during part or all of a CET period (e.g., for part or all of the CET period described with reference to FIG. 4) every M seconds (or minutes) to detect a transmission of a CET of the second base station of the at least one second operator. When ceasing data transmissions of the first base station of the first operator, and in some examples, the at least one time sub-interval may change from a first of the plurality of time intervals to a second of the plurality of time intervals. For example, the first base station of the first operator may cease data transmission for a first K milliseconds of a CET period during one M second time interval, and cease data transmissions for a different K milliseconds of the CET period during a next M second time interval.

The operation(s) at block 1215 may be performed using the wireless communication management module 620, 720, or 820 described with reference to FIG. 6, 7, or 8, the CET timing information monitoring module 735 or 845 described with reference to FIG. 7 or 8, the CET monitoring module 850 described with reference to FIG. 8, or the base station wireless communication management module 960 described with reference to FIG. 9.

At block 1220, the method 1200 may include identifying transmission timings of CETs of the second base station of the at least one second operator based at least in part on the monitoring. The operation(s) at block 1220 may be performed using the wireless communication management module 620, 720, or 820 described with reference to FIG. 6, 7, or 8, the CET transmission timing identification module 740 or 860 described with reference to FIG. 7 or 8, or the base station wireless communication management module 960 described with reference to FIG. 9.

At block 1225, the method 1200 may include discontinuing the transmissions of a cell of the first base station of the first operator during the transmission timings of the CETs of the second base station of the at least one second operator. The cell may use an unlicensed radio frequency spectrum band (e.g., a radio frequency spectrum band, such as Wi-Fi radio frequency spectrum band, for which apparatuses may need to contend for access because the radio frequency spectrum band is available for unlicensed use, such as an unlicensed radio frequency spectrum band usable for LTE/LTE-A communications) that supports an SDL mode of operation. In some examples, the transmissions may be discontinued for one or more LBT frames, subframes, or other transmission increments of the cell, which transmission increments overlap the transmission timings of the CETs of the second base station of the at least one second operator. The operation(s) at block 1225 may be performed using the wireless communication management module 620, 720, or 820 described with reference to FIG. 6, 7, or 8, the transmission discontinuation management module 745 or 865 described with reference to FIG. 7 or 8, or the base station wireless communication management module 960 described with reference to FIG. 9.

In some examples of the method 1200, the method 1200 may include discontinuing the transmissions of a cell of the first base station of the first operator during the transmission timings of CETs of base stations of one or more operators (e.g., L operators). When the CET of each of L operators has a period of T(CET) milliseconds, the maximum overhead for discontinuing transmissions of the first base station of the first operator is 2L/T(CET) milliseconds, where the quantity 2L accounts for a CET of a base station of a second or additional operator overlapping two one millisecond subframes of the first base station of the first operator.

In some examples of the method 1200, the method 1200 may include discontinuing the transmissions of the first base station of the first operator during the transmission timings of both uplink and downlink CETs of base stations of one or more operators (e.g., L operators). When uplink and downlink CETs of each of L operators have a period of T(CET) milliseconds, the maximum overhead for discontinuing transmissions of the first base station of the first operator is 4L/T(CET) milliseconds (e.g., 2×2L/T(CET) milliseconds).

In some examples of the method 1200, the method may include discontinuing the transmissions of multiple cells of the first base station of the first operator during the transmission timings of the CETs of the second base station of the at least one second operator (or during the transmission timings of CETs of base stations of multiple operators).

Thus, the method 1200 may provide for wireless communication. It should be noted that the method 1200 is just one implementation and that the operations of the method 1200 may be rearranged or otherwise modified such that other implementations are possible.

Figure 13:
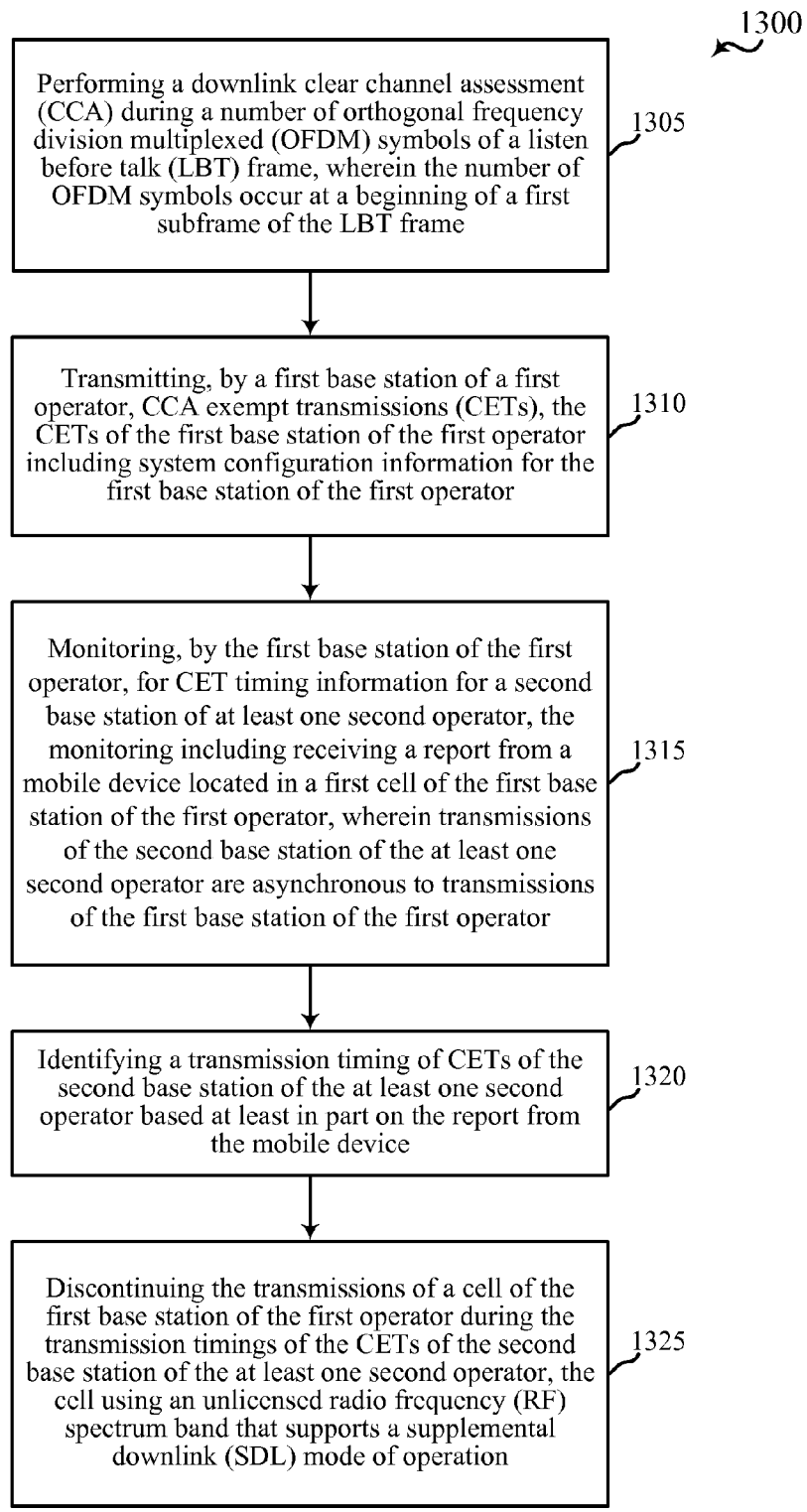
FIG. 13 is a flow chart illustrating an example of a method for wireless communication, in accordance with various aspects of the present disclosure.

FIG. 13 is a flow chart illustrating an example of a method 1300 for wireless communication, in accordance with various aspects of the present disclosure. For clarity, the method 1300 is described below with reference to aspects of one or more of the base stations 105, 205, or 905 described with reference to FIG. 1, 2, or 9, or one or more aspects of the apparatus 605, 705, or 805 described with reference to FIG. 6, 7, or 8. In some examples, a base station or apparatus may execute one or more sets of codes to control the functional elements of the base station or apparatus to perform the functions described below.

At block 1305, the method 1300 may include performing a downlink CCA during a number of OFDM symbols of an LBT frame. By way of example, the LBT frame may have a duration of two milliseconds, five milliseconds, or ten milliseconds. The number of OFDM symbols may occur at a beginning of a first subframe of the LBT frame. The operation(s) at block 1205 may be performed using the wireless communication management module 620, 720, or 820 described with reference to FIG. 6, 7, or 8, the downlink CCA management module 835 described with reference to FIG. 8, or the base station wireless communication management module 960 described with reference to FIG. 9.

At block 1310, the method 1300 may include transmitting, by a first base station of a first operator, CETs of the first base station. The CETs of the first base station of the first operator may include system configuration information for the first base station of the first operator. In some examples, the first base station may be the base station 105, 205, or 905 described with reference to FIG. 1, 2, or 9, or the first base station may include (or be included in) the apparatus 605, 705, or 805 described with reference to FIG. 6, 7, or 8. In some examples, the system configuration information for the first base station of the first operator may include information regarding a configuration of the LBT frame. In some examples, the information regarding the configuration of the LBT frame may indicate a duration of the LBT frame as two milliseconds, five milliseconds, or ten milliseconds. The operation(s) at block 1310 may be performed using the wireless communication management module 620, 720, or 820 described with reference to FIG. 6, 7, or 8, the CET transmission management module 840 described with reference to FIG. 8, or the base station wireless communication management module 960 described with reference to FIG. 9.

At block 1315, the method 1300 may include monitoring, by a first base station of a first operator, for CET timing information of a second base station of at least one second operator. Transmissions of the second base station of the at least one second operator (including, for example, CETs) may be asynchronous to transmissions of the first base station of the first operator. The monitoring may include receiving a report from a mobile device located in a first cell of the first base station of the first operator.

The report from the mobile device may take a variety of forms. In one example, the report from the mobile device may include a timing difference between the first base station of the first operator and the second base station of the at least one second operator (e.g., a timing difference between a first PLMN of the first operator and a second PLMN of the at least one second operator), wherein the mobile device is served by the first base station of the first operator. The timing difference may in some cases be reported as an SFN difference, a subframe number difference, and a timing difference within a subframe. In another example, the report from the mobile device may include a timing difference between a reference CET timing and the transmission timings of the CETs of the second base station of the at least one second operator. In yet the above and other examples, the report from the mobile device may include a PLMN identifier of the at least one second operator, the mobile device being a member of a PLMN of the first operator. The PLMN identifier of the at least one second operator enables the report to be indexed for use in identifying transmission timings of CETs of the second base station of the at least one second operator.

In some examples of the method 1300, the report from the mobile device may be transmitted with a measurement report (e.g., an RSRP/RSRQ or other measurement report).

The operation(s) at block 1315 may be performed using the wireless communication management module 620, 720, or 820 described with reference to FIG. 6, 7, or 8, the CET timing information monitoring module 735 or 845 described with reference to FIG. 7 or 8, the report monitoring module 855 described with reference to FIG. 8, or the base station wireless communication management module 960 described with reference to FIG. 9.

At block 1320, the method 1300 may include identifying transmission timings of CETs of the second base station of the at least one second operator based at least in part on the report from the mobile device. The operation(s) at block 1320 may be performed using the wireless communication management module 620, 720, or 820 described with reference to FIG. 6, 7, or 8, the CET transmission timing identification module 740 or 860 described with reference to FIG. 7 or 8, or the base station wireless communication management module 960 described with reference to FIG. 9.

At block 1325, the method 1300 may include discontinuing the transmissions of a cell of the first base station of the first operator during the transmission timings of the CETs of the second base station of the at least one second operator. The cell may use an unlicensed radio frequency spectrum band (e.g., a radio frequency spectrum band, such as Wi-Fi radio frequency spectrum band, for which apparatuses may need to contend for access because the radio frequency spectrum band is available for unlicensed use, such as an unlicensed radio frequency spectrum band usable for LTE/LTE-A communications) that supports an SDL mode of operation. In some examples, the transmissions may be discontinued for one or more LBT frames, subframes, or other transmission increments of the cell, which transmission increments overlap the transmission timings of the CETs of the second base station of the at least one second operator. The operation(s) at block 1325 may be performed using the wireless communication management module 620, 720, or 820 described with reference to FIG. 6, 7, or 8, the transmission discontinuation management module 745 or 865 described with reference to FIG. 7 or 8, or the base station wireless communication management module 960 described with reference to FIG. 9.

In some examples of the method 1300, the method 1300 may include discontinuing the transmissions of a cell of the first base station of the first operator during the transmission timings of CETs of base stations of one or more operators (e.g., L operators). When the CET of each of L operators has a period of T(CET) milliseconds, the maximum overhead for discontinuing transmissions of the first base station of the first operator is 2L/T(CET) milliseconds, where the quantity 2L accounts for a CET of a base station of a second or additional operator overlapping two one millisecond subframes of the first base station of the first operator.

In some examples of the method 1300, the method 1300 may include discontinuing the transmissions of the first base station of the first operator during the transmission timings of both uplink and downlink CETs of base stations of one or more operators (e.g., L operators). When uplink and downlink CETs of each of L operators have a period of T(CET) milliseconds, the maximum overhead for discontinuing transmissions of the first base station of the first operator is 4L/T(CET) milliseconds (e.g., 2×2L/T(CET) milliseconds).

In some examples of the method 1300, the method may include discontinuing the transmissions of multiple cells of the first base station of the first operator during the transmission timings of the CETs of the second base station of the at least one second operator (or during the transmission timings of CETs of base stations of multiple operators.

Thus, the method 1300 may provide for wireless communication. It should be noted that the method 1300 is just one implementation and that the operations of the method 1300 may be rearranged or otherwise modified such that other implementations are possible.

In some examples, one or more aspects of the methods 1100, 1200, or 1300 may be combined.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communication, comprising:
   monitoring, by a first base station of a first operator, for clear channel assessment (CCA) exempt transmission (CET) timing information of a second base station of at least one second operator, wherein the first base station is deployed in a first network of the first operator and the second base station is deployed in a second network of the second operator, and transmissions of the second base station of the at least one second operator are asynchronous to transmissions of the first base station of the first operator;
   identifying transmission timings of CETs of the second base station of the at least one second operator based at least in part on the monitoring, wherein the CETs are transmitted to a first mobile device served by the second base station and deployed in the second network of the second operator; and
   discontinuing the transmissions of the first base station of the first operator during the transmission timings of the CETs of the second base station of the at least one second operator.

2. The method of claim 1, wherein the monitoring comprises:
   detecting the CET timing information for the second base station of the at least one second operator directly from the second base station of the at least one second operator.

3. The method of claim 2, wherein the monitoring comprises:
   ceasing data transmissions of the first base station of the first operator during at least one time sub-interval of each of a plurality of time intervals to detect a transmission of a CET of the second base station of the at least one second operator.

4. The method of claim 3, wherein the at least one time sub-interval changes from a first of the plurality of time intervals to a second of the plurality of time intervals.

5. The method of claim 1, wherein:
   the monitoring comprises receiving a report from a second mobile device located in a first cell of the first base station of the first operator; and
   the identifying comprises identifying the transmission timings of the CETs of the second base station of the at least one second operator based at least in part on the report from the second mobile device.

6. The method of claim 5, wherein the report from the second mobile device comprises:
   a timing difference between the first base station of the first operator and the second base station of the at least one second operator, wherein the second mobile device is served by the first base station of the first operator.

7. The method of claim 5, wherein the report from the second mobile device comprises:
   a timing difference between a reference CET timing and the transmission timings of the CETs of the second base station of the at least one second operator.

8. The method of claim 5, wherein the report from the second mobile device comprises:
   a public land mobile network (PLMN) identifier of the at least one second operator, the second mobile device being a member of a PLMN of the first operator.

9. The method of claim 1, further comprising:
   transmitting, by the first base station of the first operator, CETs of the first base station, the CETs of the first base station of the first operator comprising system configuration information for the first base station of the first operator.

10. The method of claim 9, wherein the system configuration information for the first base station of the first operator comprises:

information regarding a configuration of a listen before talk (LBT) frame.

11. The method of claim 10, wherein the information regarding the configuration of the LBT frame indicates a duration of the LBT frame as two milliseconds or five milliseconds.

12. The method of claim 1, further comprising:
performing a downlink CCA during a number of orthogonal frequency division multiplexed (OFDM) symbols of a listen before talk (LBT) frame, wherein the number of OFDM symbols occur at a beginning of a first subframe of the LBT frame.

13. The method of claim 1, wherein the discontinuing of the transmissions of the first base station of the first operator comprises:
discontinuing transmissions of a cell using an unlicensed radio frequency spectrum band that supports a supplemental downlink (SDL) mode of operation.

14. An apparatus for wireless communication, comprising:
means for monitoring, by a first base station of a first operator, for clear channel assessment (CCA) exempt transmission (CET) timing information of a second base station of at least one second operator, wherein the first base station is deployed in a first network of the first operator and the second base station is deployed in a second network of the second operator, and transmissions of the second base station of the at least one second operator are asynchronous to transmissions of the first base station of the first operator;
means for identifying transmission timings of CETs of the second base station of the at least one second operator based at least in part on the monitoring, wherein the CETs are transmitted to a first mobile device served by the second base station and deployed in the second network of the second operator; and
means for discontinuing the transmissions of the first base station of the first operator during the transmission timings of the CETs of the second base station of the at least one second operator.

15. The apparatus of claim 14, wherein the means for monitoring comprises:
means for detecting the CET timing information for the second base station of the at least one second operator directly from the second base station of the at least one second operator.

16. The apparatus of claim 15, wherein the means for monitoring comprises:
means for ceasing data transmissions of the first base station of the first operator during at least one time sub-interval of each of a plurality of time intervals to detect a transmission of a CET of the second base station of the at least one second operator.

17. The apparatus of claim 16, wherein the at least one time sub-interval changes from a first of the plurality of time intervals to a second of the plurality of time intervals.

18. The apparatus of claim 14, wherein:
the means for monitoring comprises means for receiving a report from a second mobile device located in a first cell of the first base station of the first operator; and
the means for identifying comprises means for identifying the transmission timings of the CETs of the second base station of the at least one second operator based at least in part on the report from the second mobile device.

19. The apparatus of claim 18, wherein the report from the second mobile device comprises:

a timing difference between the first base station of the first operator and the second base station of the at least one second operator, wherein the second mobile device is served by the first base station of the first operator.

20. The apparatus of claim 18, wherein the report from the second mobile device comprises:
a timing difference between a reference CET timing and the transmission timings of the CETs of the second base station of the at least one second operator.

21. The apparatus of claim 18, wherein the report from the second mobile device comprises:
a public land mobile network (PLMN) identifier of the at least one second operator, the second mobile device being a member of a PLMN of the first operator.

22. The apparatus of claim 14, further comprising:
means for transmitting, by the first base station of the first operator, CETs of the first base station, the CETs of the first base station of the first operator comprising system configuration information for the first base station of the first operator.

23. The apparatus of claim 22, wherein the system configuration information for the first base station of the first operator comprises:
information regarding a configuration of a listen before talk (LBT) frame.

24. An apparatus for wireless communication, comprising:
a processor;
memory in electronic communication with the processor; and
instructions stored in the memory, the instructions being executable by the processor to:
monitor, by a first base station of a first operator, for clear channel assessment (CCA) exempt transmission (CET) timing information of a second base station of at least one second operator, wherein the first base station is deployed in a first network of the first operator and the second base station is deployed in a second network of the second operator, and transmissions of the second base station of the at least one second operator are asynchronous to transmissions of the first base station of the first operator;
identify transmission timings of CETs of the second base station of the at least one second operator based at least in part on the monitoring, wherein the CETs are transmitted to a first mobile device served by the second base station and deployed in the second network of the second operator; and
discontinue the transmissions of the first base station of the first operator during the transmission timings of the CETs of the second base station of the at least one second operator.

25. The apparatus of claim 24, wherein the instructions executable by the processor to monitor comprise instructions executable by the processor to:
detect the CET timing information for the second base station of the at least one second operator directly from the second base station of the at least one second operator.

26. The apparatus of claim 25, wherein the instructions executable by the processor to monitor comprise instructions executable by the processor to:
cease data transmissions of the first base station of the first operator during at least one time sub-interval of each of a plurality of time intervals to detect a transmission of a CET of the second base station of the at least one second operator.

27. The apparatus of claim 26, wherein the at least one time sub-interval changes from a first of the plurality of time intervals to a second of the plurality of time intervals.

28. The apparatus of claim 24, wherein:
the instructions executable by the processor to monitor comprise instructions executable by the processor to receive a report from a second mobile device located in a first cell of the first base station of the first operator; and
the instructions executable by the processor to identify comprise instructions executable by the processor to identify the transmission timings of the CETs of the second base station of the at least one second operator based at least in part on the report from the second mobile device.

29. A non-transitory computer-readable medium storing computer-executable code for wireless communications, the code executable by at least one processor to:
monitor, by a first base station of a first operator, for clear channel assessment (CCA) exempt transmission (CET) timing information of a second base station of at least one second operator, wherein the first base station is deployed in a first network of the first operator and the second base station is deployed in a second network of the second operator, and transmissions of the second base station of the at least one second operator are asynchronous to transmissions of the first base station of the first operator;
identify transmission timings of CETs of the second base station of the at least one second operator based at least in part on the monitoring, wherein the CETs are transmitted to a first mobile device served by the second base station and deployed in the second network of the second operator; and
discontinue the transmissions of the first base station of the first operator during the transmission timings of the CETs of the second base station of the at least one second operator.

30. The computer-readable medium of claim 29, wherein the code is executable by the at least one processor to:
detect the CET timing information for the second base station of the at least one second operator directly from the second base station of the at least one second operator.

* * * * *